INVENTOR
Johann F. Reuteler

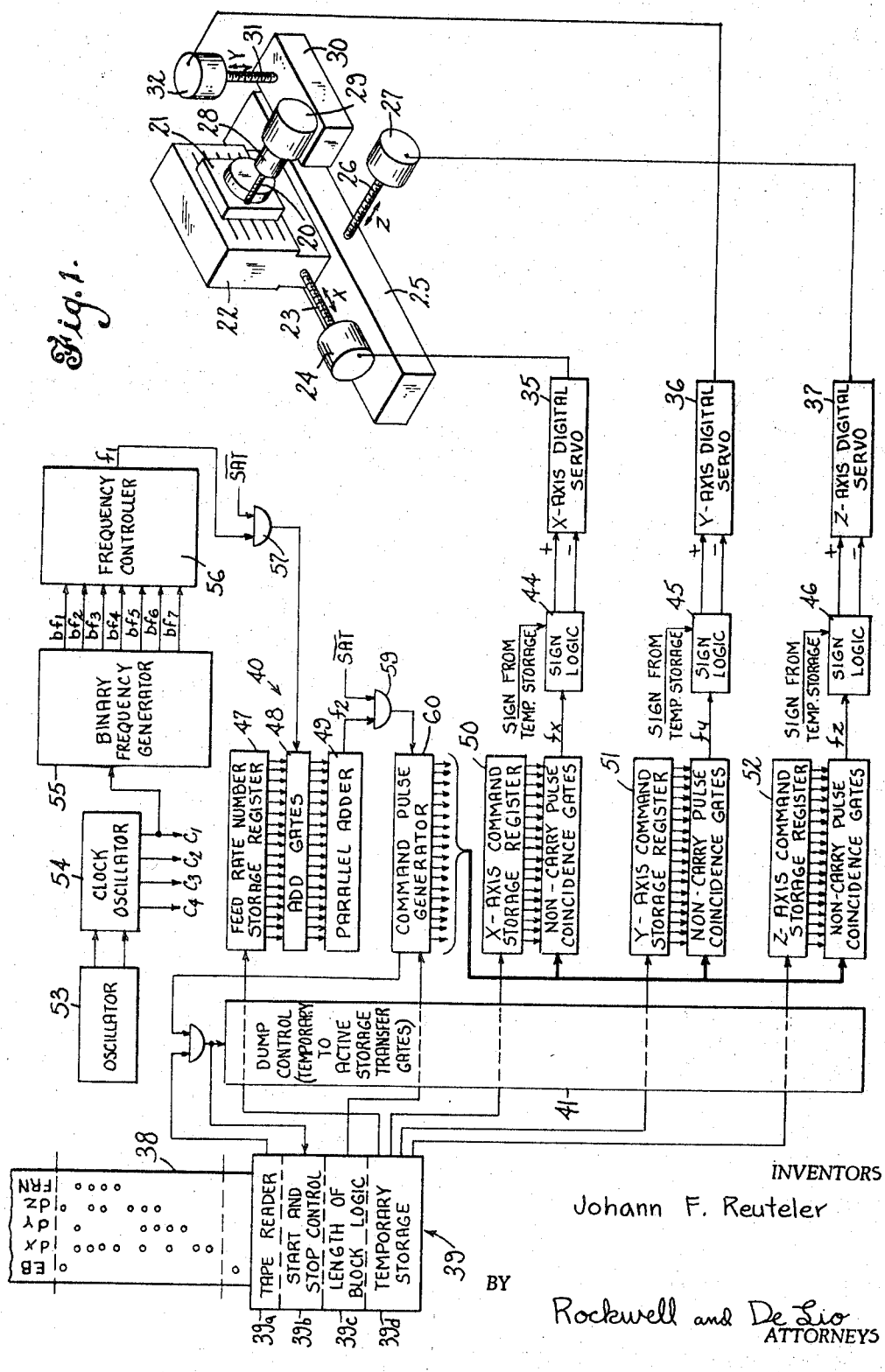

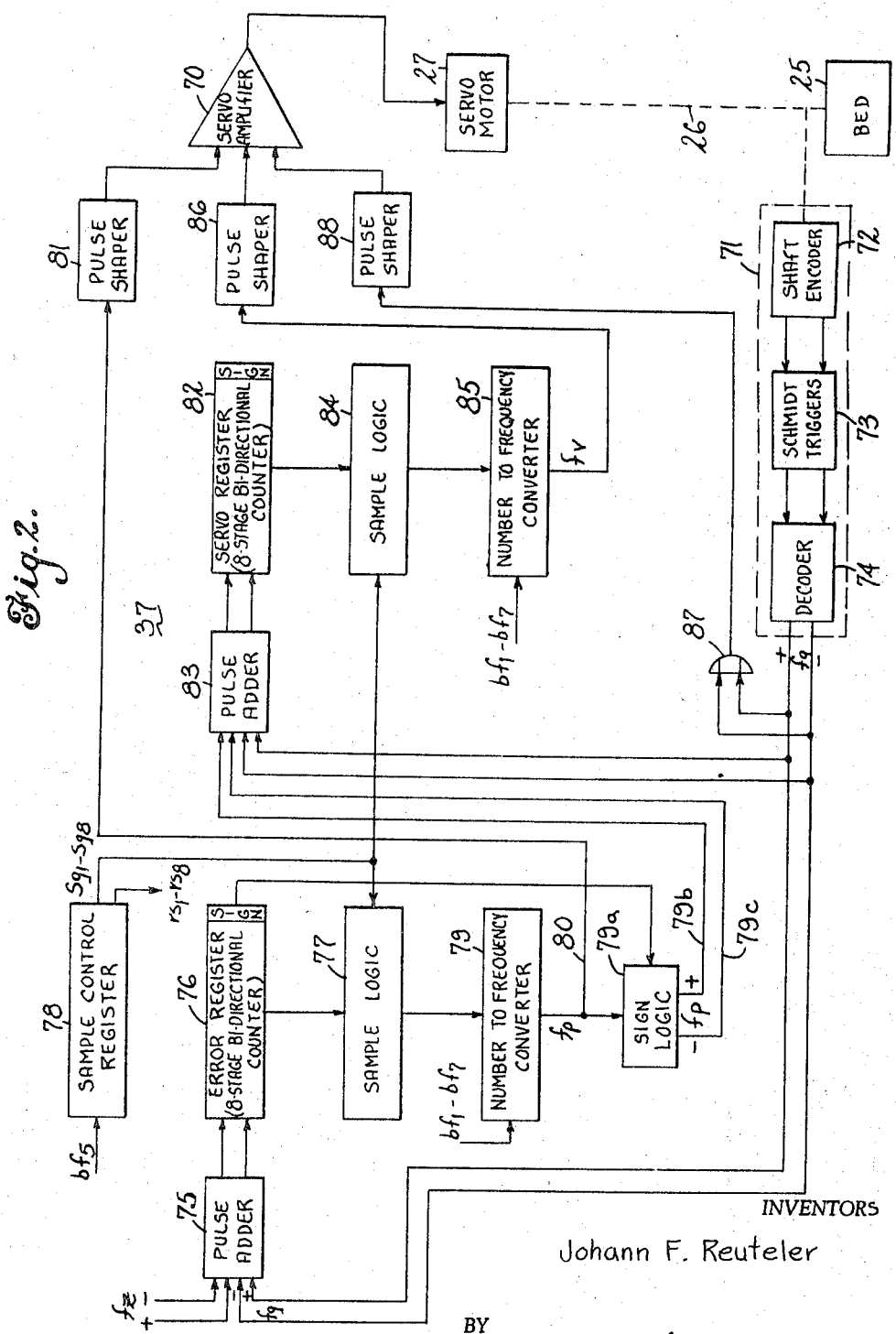

BY Rockwell and DeLio
ATTORNEYS

INVENTOR
Johann F. Reuteler

BY Rockwell and DeLio
ATTORNEYS

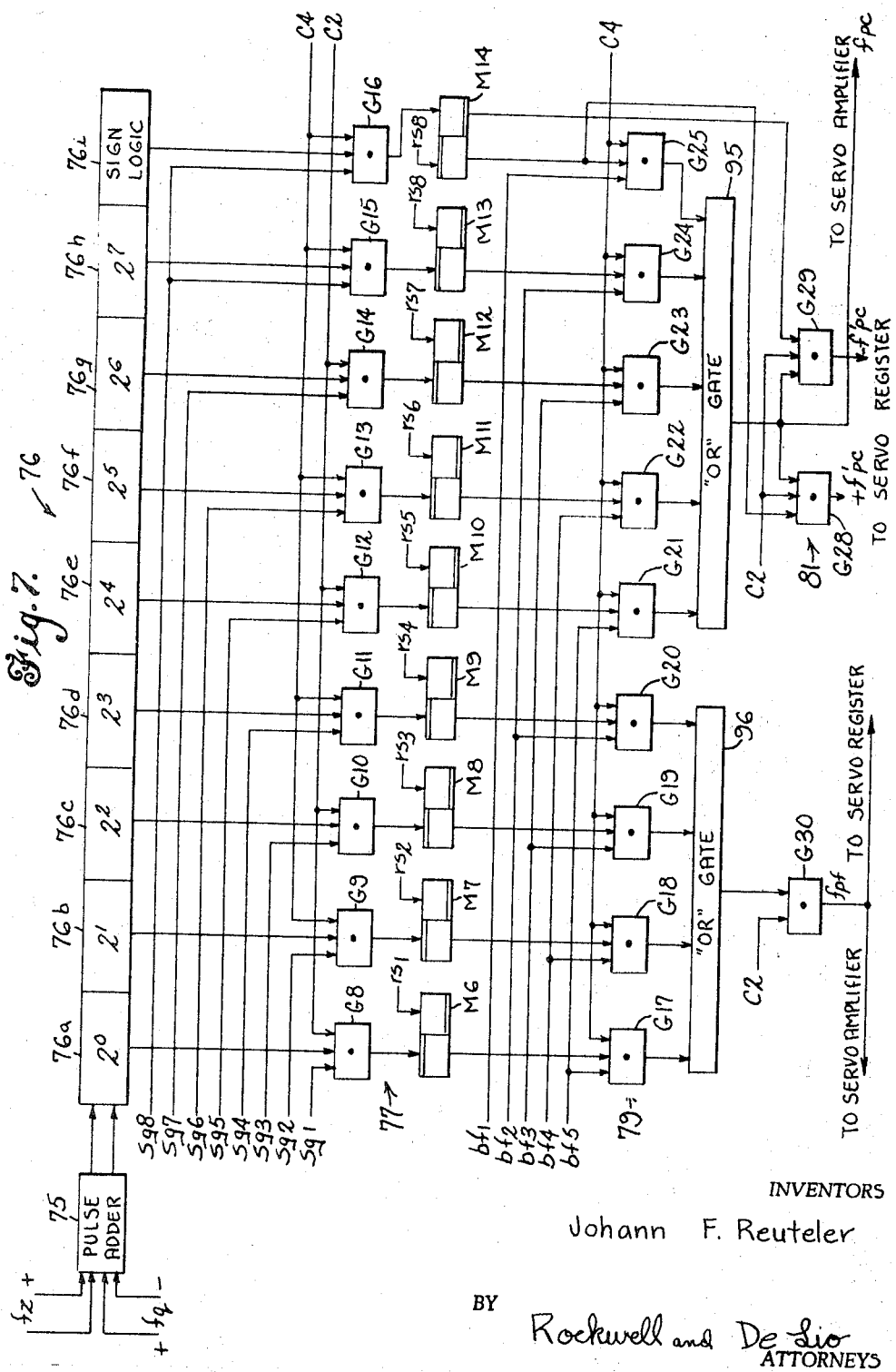

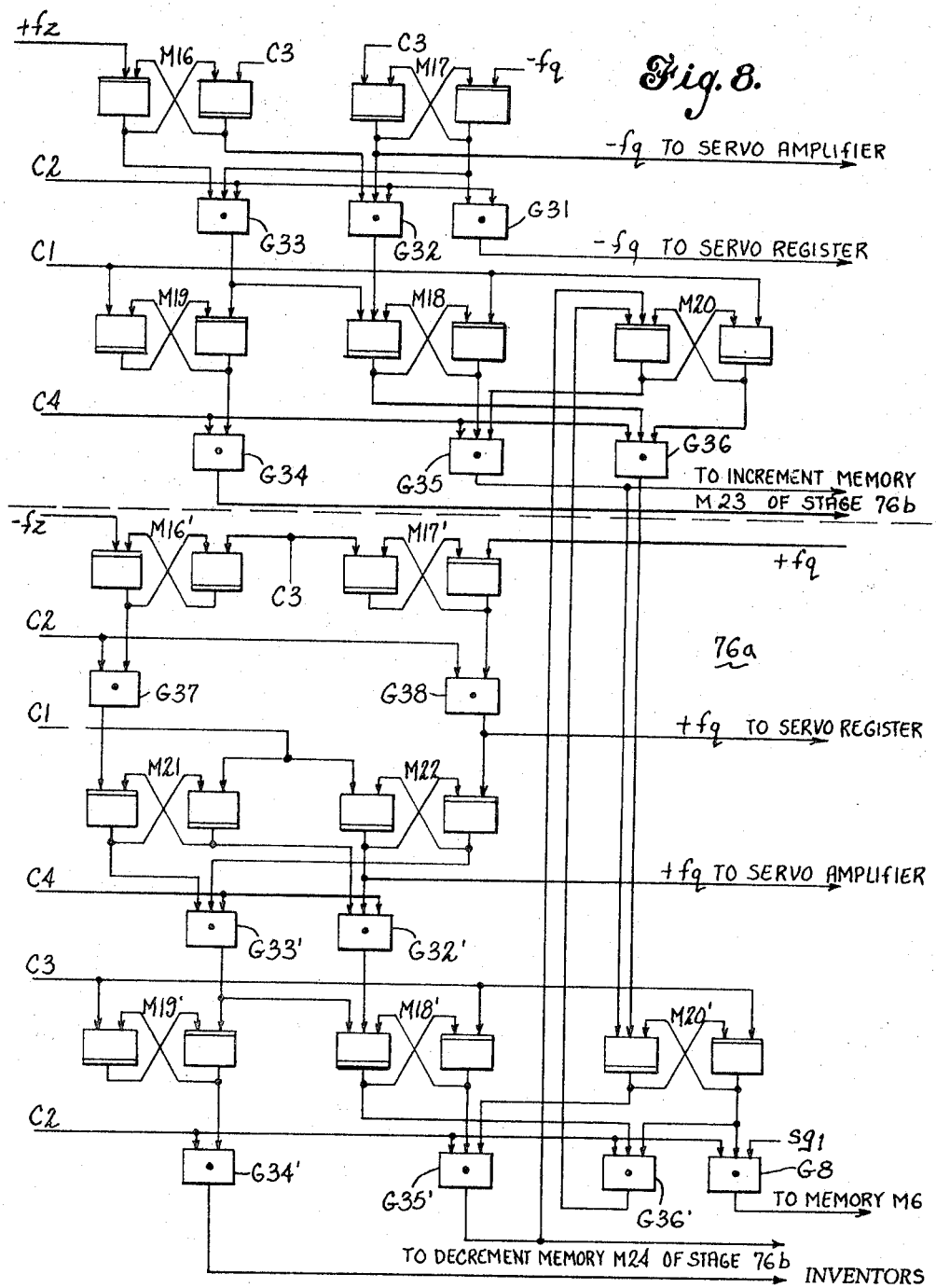

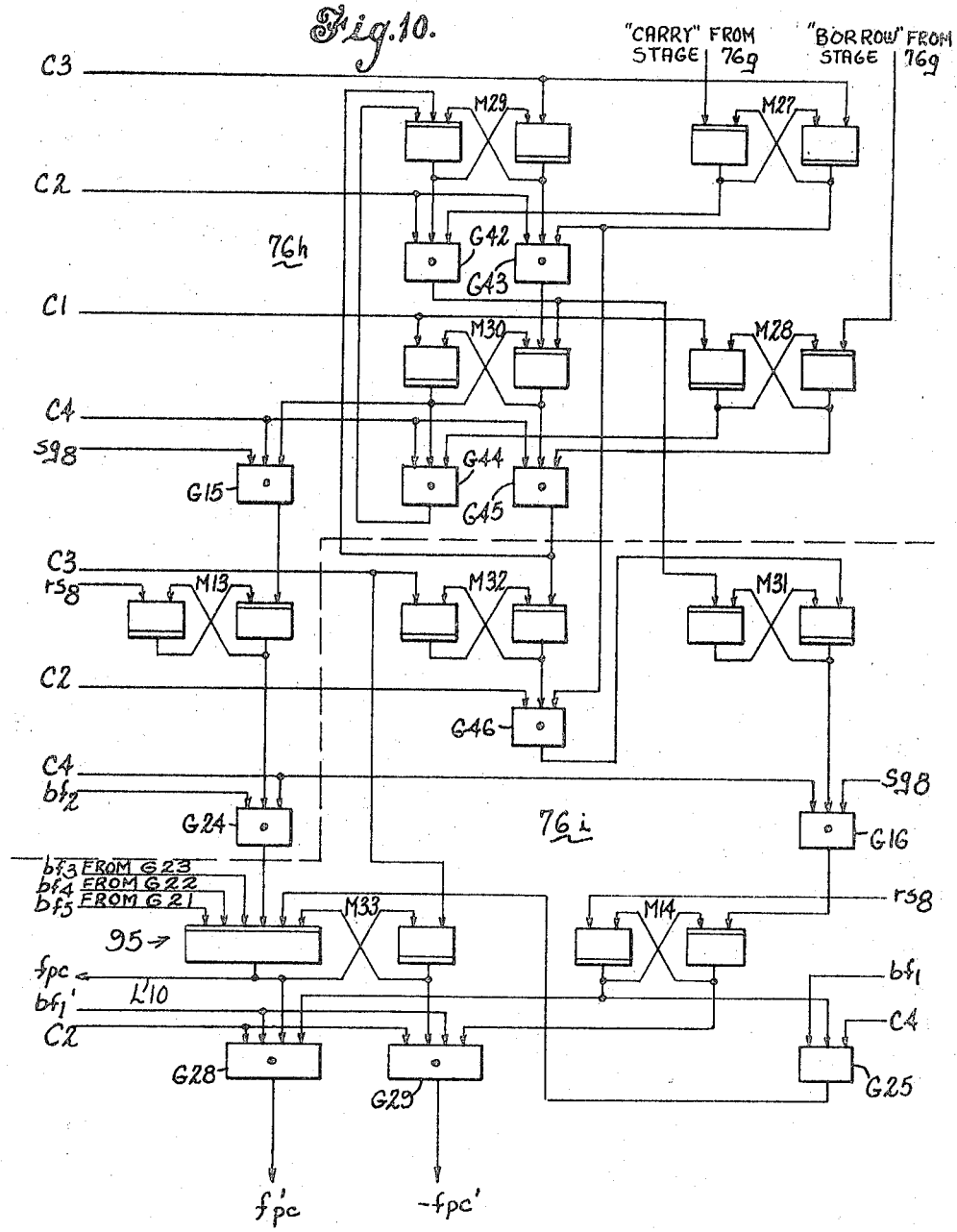

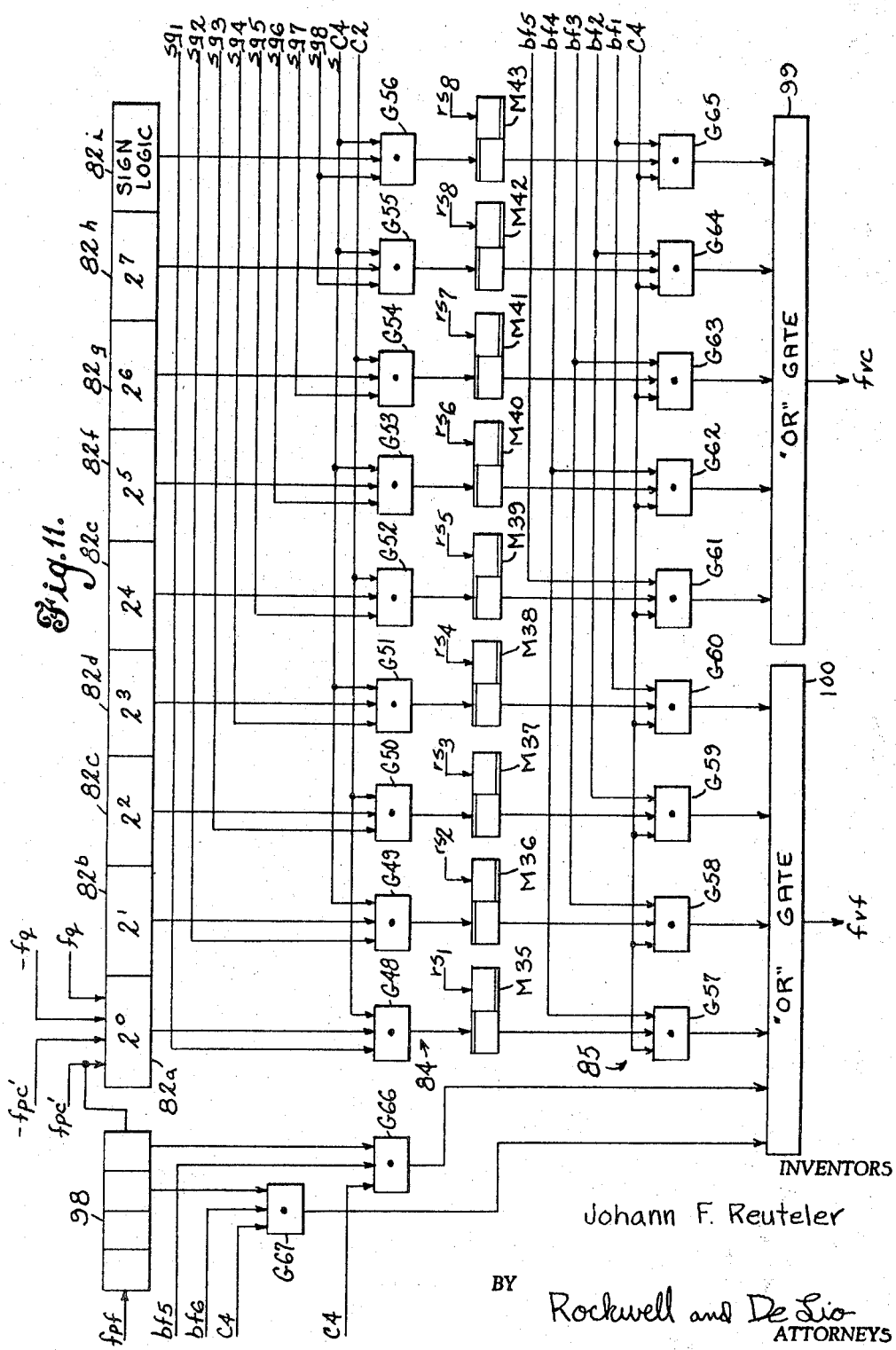

INVENTORS
Johann F Reuteler
BY Rockwell and DeLio
ATTORNEYS

United States Patent Office

3,443,178
Patented May 6, 1969

3,443,178
SERVO SYSTEM
Johann F. Reuteler, Elmwood, Conn., assignor to Pratt & Whitney Inc., West Hartford, Conn.
Filed Mar. 4, 1964, Ser. No. 349,216
Int. Cl. H02p 1/54, 5/46
U.S. Cl. 318—18      27 Claims

ABSTRACT OF THE DISCLOSURE

This disclosure relates to a servo system having both position and velocity loops. A feedback signal indicative of both extent of movement and velocity is derived. This feedback signal is compared with a command signal to derive a representation of position error and a velocity signal proportional to the position representation. The proportional velocity signal is then compared with the feedback signal to provide a representation of the difference therebetween and a second velocity signal is then derived. The first and second velocity signals are then combined in a predetermined relation to provide a resultant signal for moving the object at the desired velocity.

---

This invention relates to servo systems and more particularly relates to servo systems of a type adapted to move an object from one point to another at a predetermined rate or velocity.

A servo system of the type to which this invention relates may generally comprise a prime mover which drives an object a distance and at a rate determined by a command signal. Feedback means are included to provide a signal or signals proportional to actual position and velocity of the object. The position feedback signal is then compared with the command signal to determine the error between the commanded velocity and the actual velocity. This velocity error signal may be utilized to determine the error between actual and commanded position. This portion of the servo system may be termed the position loop. Subsequently a signal which is a function of the position error is compared with a velocity feedback signal to derive a signal which is indicative of a new velocity of the object which is required to eliminate the error between the commanded velocity and the actual velocity. This second feedback circuit may be termed a velocity loop.

In any positioning servo system there is *always* a time lag between the actual position of the object and the commanded position as stated by the system input command signal, when the position command is changed. This lag is due to time constants, both electrical and mechanical, of the components comprising the system. The gain of the position loop determines the steady state velocity lag of the system as well as affecting the transient response to changing command signals. This lag must be a rigid function of the velocity of the object in order to keep the tracking error zero under steady state conditions. These requirements are especially important in a system utilizing a plurality of servo systems where an object is moved with respect to two or more axes along a prescribed path or where a first object is moved relative to a second object to define a predetermined path. In such systems, the time between the commanded position and the actual position must be consistent with respect to all servo systems in order that the resultant movement of the object(s) with respect to all axes be along the desired path.

The present invention provides a new and improved servo system adapted to control motion of an object(s) simultaneously with respect to a plurality of reference paths. The invention provides means for maintaining a consistent time lag between the commanded position of an object and the actual position thereof with respect to a plurality of non-coincident reference paths where movement is controlled by a plurality of servo systems. The invention further provides new and improved means for setting the position loop gain, which affects transient response, without affecting the gain of the velocity loop.

While the invention is applicable to positioning servo systems generally, it is particularly useful in digital servo systems which move an object a distance proportional to a number of pulses received thereby and at a velocity proportional to the rate of repetition of the pulses. Such a system is described in the co-pending application of Johann F. Reuteler and Edward E. Kirkham, Ser. No. 349,222 filed on the same date and assigned to the same assignee as this application.

This co-pending application discloses and claims a servo system where command and feedback pulses are compared to derive a pulse frequency indicative of the velocity error. The velocity error is integrated by means of a bi-directional pulse counter to provide a representation of the position error. A pulse frequency, which is a velocity signal, is then generated in response to this representation. This velocity signal which is a function of the position error is then compared with the feedback pulses to provide a second pulse frequency which is indicative of the velocity change required of the prime mover to eliminate the velocity error. This second pulse frequency may be numerically represented in a bi-directional pulse counter to eliminate any drift tendencies, and another pulse frequency generated which is proportional to this numerical representation. This resulting pulse frequency is utilized to accelerate the prime mover to eliminate the velocity error.

This invention further provides new and improved means for generating a pulse frequency proportional in number of pulses and frequency to the magnitude of a numerical representation, and further indicative of the algebraic sign of the numerical representation. The invention further provides a new and improved pulse responsive amplifier for controlling the operation of a servo system prime mover.

Accordingly, an object of this invention is to provide a new and improved servo system.

Another object of this invention is to provide a new and improved servo system of a type which moves an object a distance proportional to a number of command pulses received and at a velocity proportional to the repetition rate of the pulses.

Another object of this invention is to provide a servo system of the type described having new and improved means to control the position loop again without affecting the velocity lag constant.

Another object of this invention is to provide new and improved means for generating a pulse frequency which is proportional in number of pulses and repetition rate to the magnitude of a number, and further contains intelligence indicative of the algebraic sign of the number.

A further object of the invention is to provide a new and improved pulse responsive amplifying arrangement which facilitates independent adjustment of the position loop gain and velocity loop gain in a servo system of the type described.

A further object of this invention is to provide a new and improved bi-directional pulse counter which is so constructed as to allow simultaneous application of incrementing and decrementing pulses thereto, and further include new and improved means for indicating the algebraic sign of a number stored therein.

The novel features of the invention are pointed out with particularity and distinctly claimed in the concluding portion of this specification. However, the invention both as to organization and operation together with further objects and advantages thereof may best be appreciated by reference to the following detail description taken in conjunction with the drawings, in which:

FIG. 1 is a functional block diagram of a numerical control system including digital servo systems which is set forth for purposes of orientation;

FIG. 2 is a block diagram of a digital servo system embodying the invention;

Figure 6:
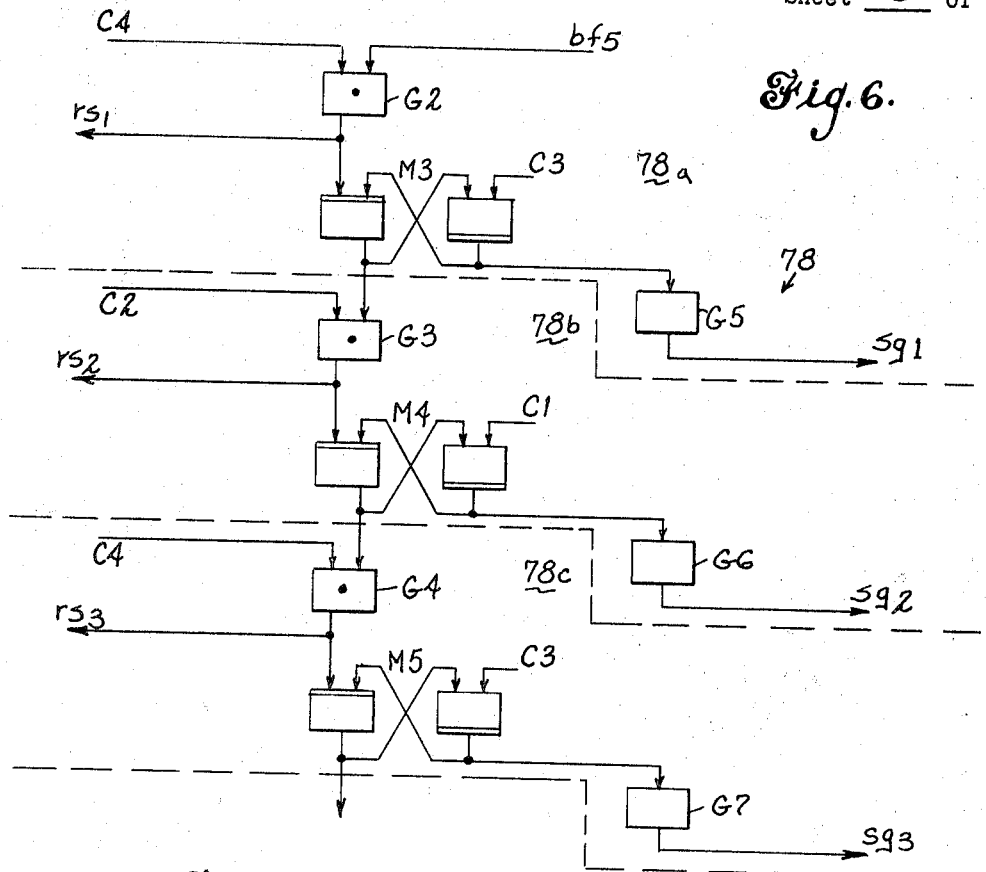
Figure 4A:
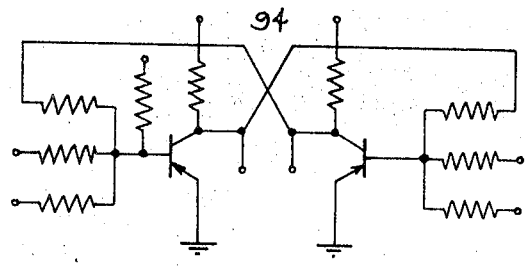
Figure 4B:
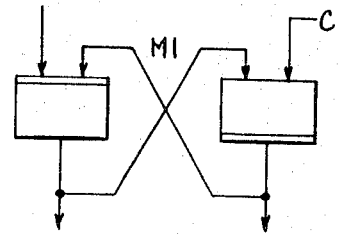
Figure 4C:
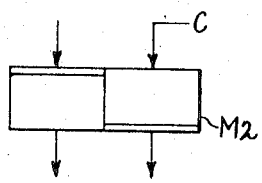
Figure 5:
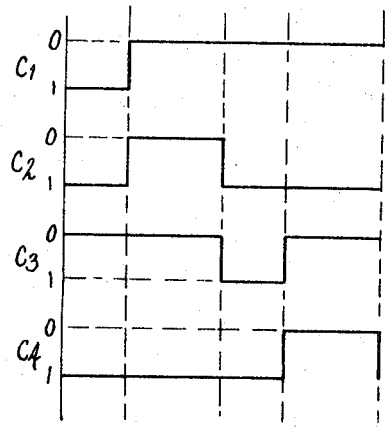

FIGS. 4a, 4b, and 4c are diagrams of a bi-stable device;

FIG. 5 is a diagram of the waveform of the clock oscillator of FIG. 1;

FIG. 6 is a schematic diagrm of a serial pulse generator used for gating and resetting purposes;

FIG. 7 is a diagram, partly schematic and partly in block form of the position error register, sampling logic and number-to-frequency converter shown in functional block form in FIG. 2.

Figure 9:
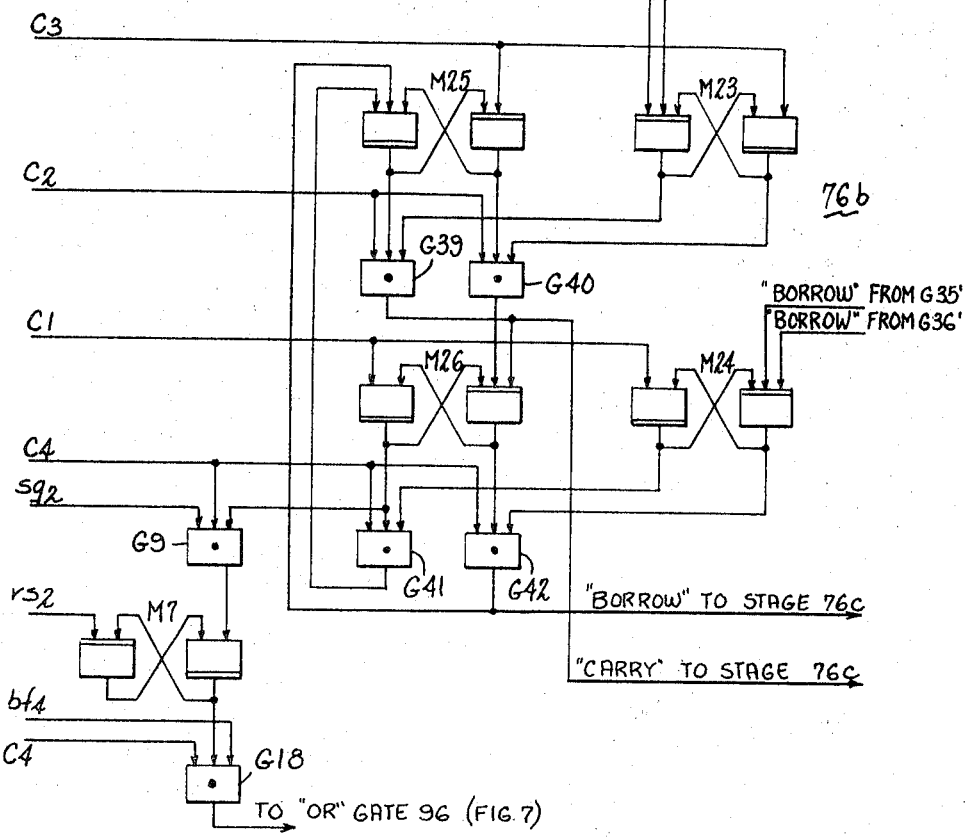

FIG. 8 is a schematic diagram of the input stage of a bi-directional counter, comprising the error register of FIG. 7, adapted to receive incrementing and decrementing pulse inputs;

FIG. 9 is a continuation of FIG. 8 showing the second stage of the binary counter;

FIG. 10 is a schematic diagram of the most significant numerical stage of the binary counter initially shown in FIG. 7, together with a concluding stage which senses the algebraic sign of the number in the counter.

Figure 13:
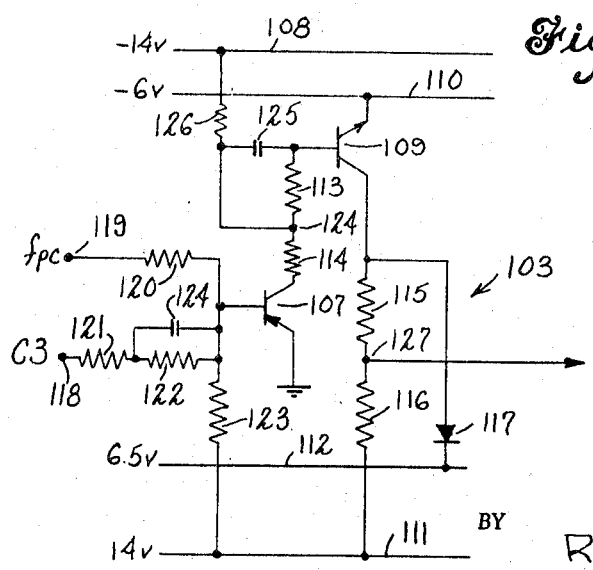
Figure 12:
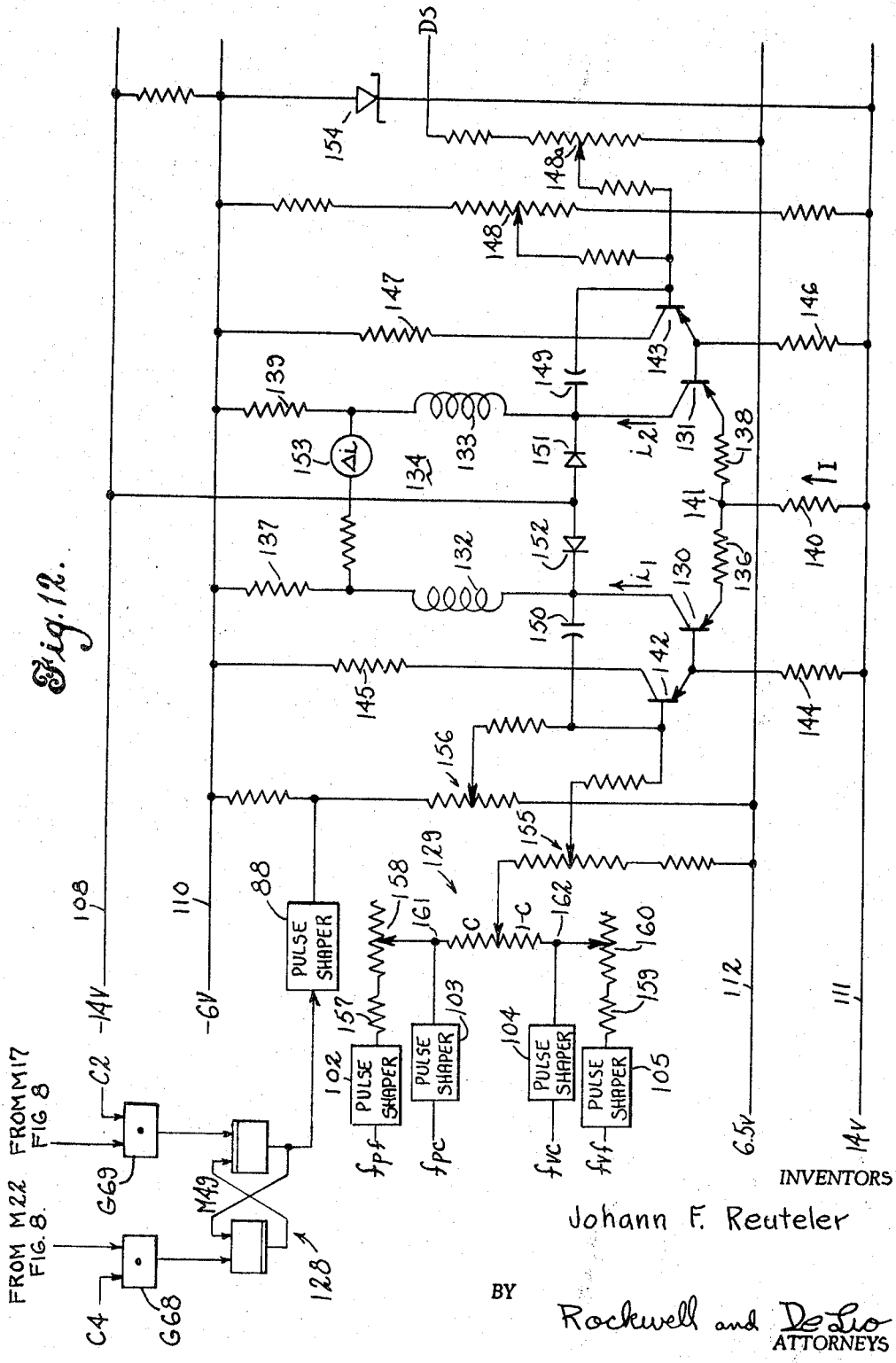
Figure 14:
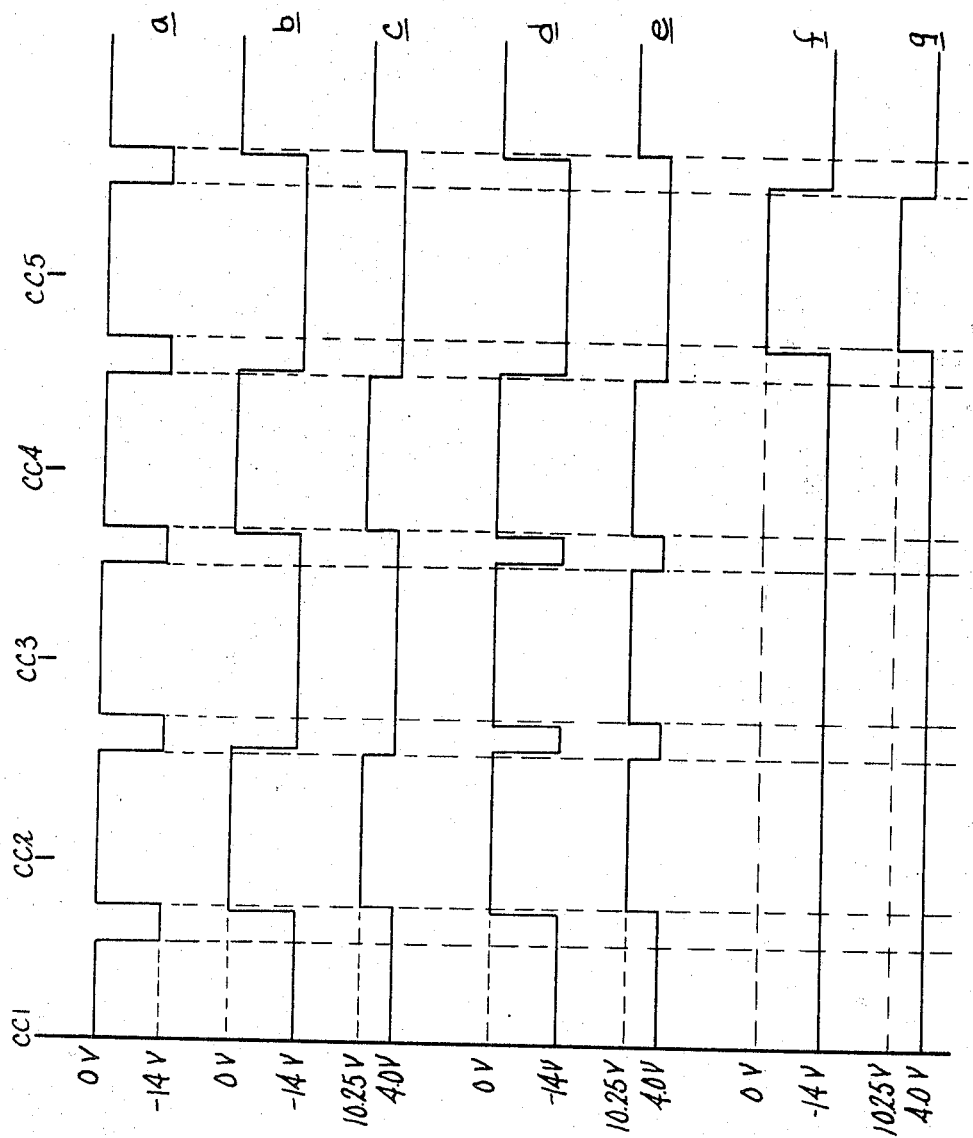
Figure 15:
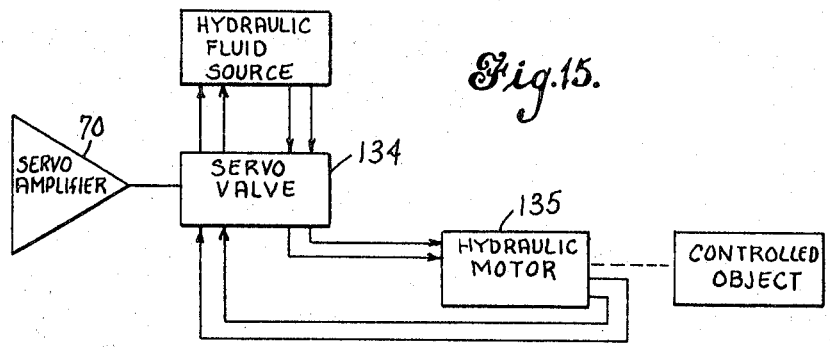
Figure 17:
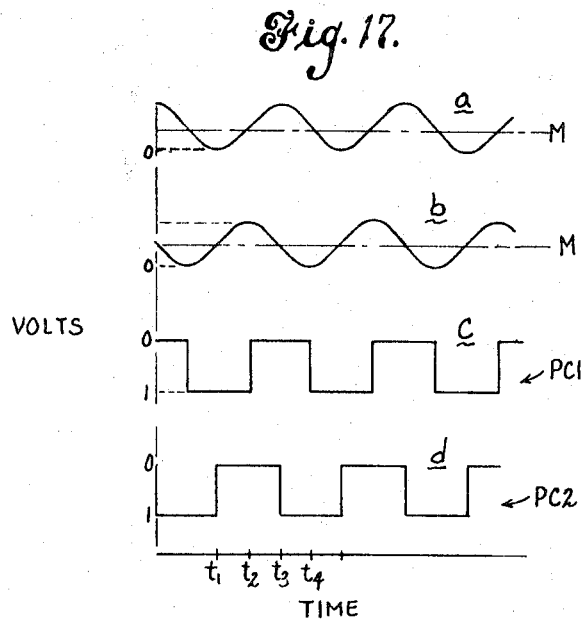
Figure 16:
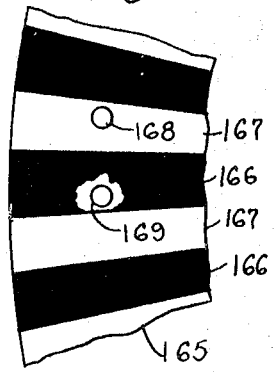
Figure 18:
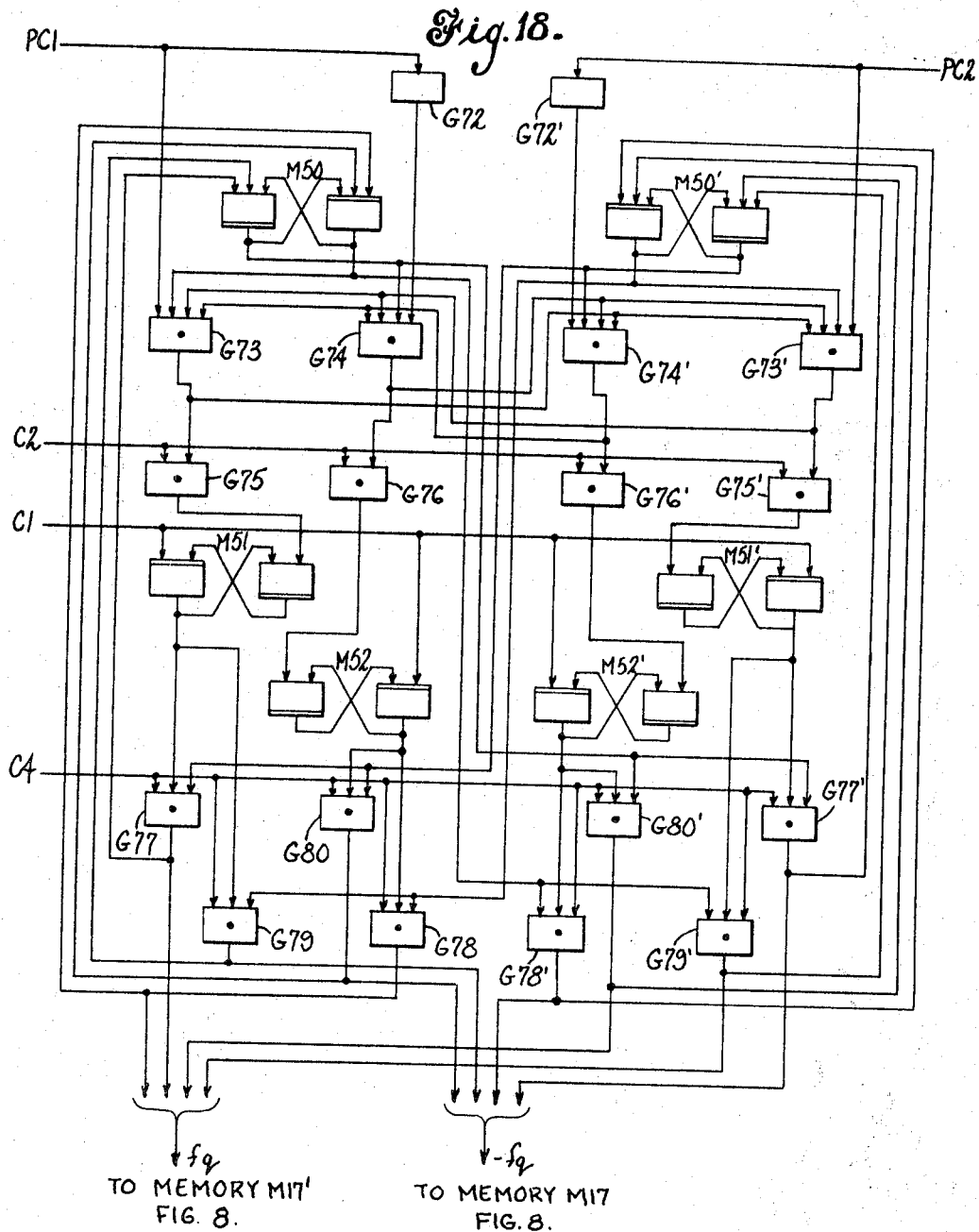

FIG. 11 is a diagram, partly schematic and partly in associated sample logic and number-to-frequency converblock form of the servo register of FIG. 2 together with ter previously shown in functional block form in FIG. 2;

FIG. 12 is a schematic diagram of a servo amplifier;

FIG. 13 is a schematic diagram of a preferred pulse shaper;

FIG. 14 is a voltage vs. time plot of the output waveform of the pulse shaper of FIG. 13;

FIG. 15 is a functional block diagram of the drive end of a typical servo system;

FIG. 16 is a diagram of a quantizer disk utilized in generating feedback pulses;

FIG. 17 is a diagram of the waveforms derived from the quantizer disk of FIG. 16 and associated trigger circuits;

FIG. 18 is a schematic diagram of a decoding network which determines the direction of movement of a controlled object and produces pulses in response to the magnitude and direction of movement thereof.

GENERAL ARRANGEMENT

A numerical control system including a plurality of digital servo systems which may embody the invention is first described functionally with reference to FIG. 1. The numerical control system of FIG. 1 is disclosed in detail and claimed in the copending application of Johann F. Reuteler, Ser. No. 349,215, filed on the same date and assigned to the same assignee as this application. The system of FIG. 1 controls the motion of a first controlled object, cutting tool 20, relative to a second controlled bject, workpiece 21, with respect to a plurality of non-coincident reference paths here illustrated as mutually perpendicular X, Y and Z axes. Relative motion between the cutting tool 20 and workpiece 21 is achieved by moving a workpiece holder 22 in either direction with respect to the X-axis by means of a lead screw 23 driven by an X-axis prime mover 24 mounted on a bed or base 25. Bed 25 is moved in either direction with respect to the Z-axis by means of a lead screw 26 driven by a prime mover 27. Cutting tool 20 is carried in a spindle 28 driven by a motor 29 mounted on a base member 30. Base 30 is movable in either direction with respect to the Y-axis by means of a lead screw 31 driven by a prime mover 32.

The prime movers 24, 27 and 32 may be electrical or hydraulic servo motors which are operated in response to the output of X, Y and Z axes digital servos 35, 36 and 37.

The digital servos 35, 36 and 37 receive movement commands in the form of discrete pulses. Each pulse applied to a servo is a command indicative of a unit distance of movement of the object controlled thereby along a particular axis. The rate of movement of the objects controlled by each servo is determined by the rate of application of command pulses thereto.

The movement commands for each axis are derived from an external medium comprising in a preferred form a flexible, essentially continuous tape 38. Various commands are encoded in binary form in parallel columns on the tape 38. The commands are feedrate number FRN which determines, at least in part, the rate of production of command pulses and hence the workrate of the machine or part being controlled; delta X ($dx$) which determines movement of work holder 22 along the X-axis; delta Y ($dy$) which determines movement of base 30 and hence cutting tool 20 relative to work holder 22 with respect to the Y-axis; delta Z ($dz$) which determines movement of bed 25 and hence work holder 22 with respect to the Z-axis; and an end of block notation EB which signifies the end of a block of information on the tape. The delta or movement commands are represented by a binary number, each unit count of the number being equal to a predetermined increment of movement along a particular axis. The last perforation or absence thereof in the $dx$, $dy$ and $dz$ columns indicates the direction of movement; for example, the direction of movement in the X and Y directions in the illustrated example is positive as indicated by lack of a hole in the last space in that column, while the direction of movement in the Z-axis is negative as determined by the presence of a perforation in the last space in the $dz$ column. The number represented in binary form in the FRN column is a feedrate number FRN which primarily determines the rate in which command pulses are supplied to the servo systems, and consequently controls the rate of motion of the machine parts.

SERVO SYSTEM

Each of the servo systems 35, 36 and 37 is identical. FIG. 2 illustrates in block form the Z-axis servo system 37. Servo system 37 is a second order or two-loop servo system in which a servo amplifier 70 receives pulse inputs directly without requiring a digital-to-analogue converter. Servo system 37 includes a means for generating discrete feedback pulses $f_q$, each proportional to an incremental distance of movement of a controlled object, here illustrated as bed 25. The pulse generating means comprises an element generally referred to as a quantizer 71 which provides output pulses $f_q$ over a positive or negative output line determined by the direction of movement of the controlled part with respect to its particular axis of movement. The quantizer 71 in a preferred form comprises a shaft encoder 72, mechanically connected to either the prime mover or lead screw 26, which furnishes output waveforms, each comprising a number of pulses indicative of the rotation of lead screw 26 and so related in phase as to indicate the direction of rotation of lead screw 26. The output waveforms of shaft encoder 72 are applied to pulse shaping networks which are preferably Schmitt trigger circuits 73, well known to those skilled in the art. The output of the Schmitt triggers are applied to a decoding network 74 which senses the direction of rotation of lead screw 26 and provides a pulse frequency output $f_q$ over either a positive or negative output line. The output pulses $f_q$ are each indicative of an incremental movement of the controlled member bed 25 which increment of movement is equal to the increment of movement commanded by each command pulse $f_z$.

Servo system 37 further comprises a pulse adder 75 which accepts plus or minus $f_z$ and $f_q$ pulses and applies $f_z$ and $f_q$ pulses to an error register 76. Error register 76 stores a numerical count proportional to the difference in the number of $f_z$ command pulses and feedback $f_q$ pulses received thereby. This numerical count represents the system position error. Error register 76 comprises an eight-stage bi-directional counter as hereinafter more fully described and a ninth-stage which determines the algebraic sign of the number held therein. Pulse adder 75 passes $f_z$ or $f_q$ pulses to error register 76 to either increment or decrement error register 76 dependent upon the sign of the pulse. If $f_z$ and $f_q$ pulses occur simultaneosuly they are algebraically added by pulse adder 75 before being passed to error register 76.

The numerical content of error register 76 is sampled every thiry-two clock cycles by a sample logic network 77 controlled by a sample control register 78 which in turn is activated by a $bf_5$ pulse which occurs every thirty-second clock cycle. Sample control register 78, as will hereinafter be more fully described, is in effect a shift pulse generator having a number of shift stages which sequentially generate shift pulses $sf_1$–$sf_8$ in response to application of a $bf_5$ pulse thereto. The shift, or as hereinafter specified, sample pulses, $sf_1$–$sf_8$ occur every half clock cycle, commencing every thiry-second clock cycle.

The sample numerical content of error register 76, which is stored in sample logic network 77 every thirty-second clock cycle is applied to a number-to-frequency converter 79, which produces a pulse frequency $f_p$, having a number of pulses proportional to the sampled numeric content of error register 76. Pulse frequency $f_p$ is immediately applied over line 80 through a pulse shaper 81 to servo amplifier 70. Pulse frequency $f_p$ is also applied through a sign logic element 79a and hence over a line 79b or 79c dependent upon the algebraic sign of the sampled number to a servo register 82 through a second pulse adder 83. Pulse adder 83 also receives positive or negative $f_q$ pulses from quantizer 71 and functions in the same manner as previously described for pulse adder 75. The pulses $f_p$ and $f_q$ are applied to servo register 82, which is substantially identical to error register 76, to either increment or decrement the number in servo register 82. The number stored in servo register 82 represents the system velocity error. A second sample logic network 84 is provided to sample the numerical content of servo register 82 under the control of sample control register 78. This numerical content of sample logic network 84 is then applied to number-to-frequency converter 85 which provides an output pulse frequency $f_v$ having a number of pulses proportional to the sampled numerical content of servo register 82. Pulse frequency $f_v$ is then passed to servo amplifier 70, through a pulse shaper 86. The quantizer output pulses $f_q$, both positive and negative, are passed by an OR gate 87 to servo amplifier 70 through a pulse shaper 88. The pulse shapers 81, 86 and 88 as hereinafter explained receive $f_p$, $f_v$ and $f_q$ pulses, respectively, and shape each pulse into corresponding pulses, all having equal amplitude and pulse widths.

The function of the sample logic networks 77 and 79 is to sample the numbers in registers 76 and 82 to provide static storage of the numbers therein for conversion to a pulse frequency. This is to provide a number for conversion to a frequency which is not subject to change by borrows or carries propagating through the counter.

The channel designated EB contains the end of block indication, identified by the presence of a perforation at the end of that column. This code appears in the same row as that which contains algebraic signs of $dx$, $dy$ and $dz$.

The EB code provides stops between commands so that one command may be distinguished from the next. The blocks of information may be of any predetermined length as needed and are made as long as the longest binary command of any of the delta or feedrate commands, within the capacity of the system as will hereinafter be made apparent. The blocks of information on the tape are successively fed into the system to insure continuous relative movement of cutting tool 20 with respect to workpiece 21. While the input medium has been illustrated as an essentially continuous tape having perforations thereon it will be understood that the input medium may take any suitable form.

The system comprises an input and temporary storage section identified by reference numeral 39 which comprises a tape reader 39a for reading the notations on tape 38 into the system, a stop and start control 39b which commences reading of a block of information from the tape and stops reading when the end of block notation is reached, logic means to determine the length of a block of information read, and a temporary storage section which stores the information on a block of tape before it is transferred to the interpolation section 40 of the system, as hereinafter described.

When a block of information has been read from the tape, the information in that block is maintained in binary notation in temporary storage registers until a signal from the interpolation section 40 of the system indicates that the previous block of information fed into the machine has been completely utilized. At this time the start and stop control 39b transfers the contents of temporary storage section 39d to interpolation and command generation section 40 of the system through a dump control 41 which comprises a plurality of coincidence gates (not shown in detail) which are enabled by a dump control gate 42. Gate 42 receives a signal from the tape reader stating that a block of information has been read, and also a signal from the interpolation section 40 of the machine stating that the previous block of information read in has been utilized, and the interpolation system is ready to receive the next block of information. At the time information is transferred from temporary storage to active storage in interpolation section 40, sign logic elements 44, 45 and 46 for each axis of motion are set in a state indicative of the direction of motion indicated on the block of tape for the block of information which has just been transferred.

When information has been transferred from temporary to active storage it must now be interpolated for use by the digital servos 35, 36 and 37. The interpolation section 40 of the system comprises a feedrate number storage register 47 which stores the feedrate number FRN in binary notation, a series of add gates 48 and a parallel adder 49 whose function is hereinafter described. The $dx$, $dy$ and $dz$ movement commands are stored in binary form in storage registers 50, 51 and 52, respectively. Storage registers 50, 51 and 52 each comprise a multiplicity of bi-stable devices which are set in a state indicative of the binary movement command for that axis.

The system includes a clock oscillator 54 which repetitively provides four clock signals, C1, C2, C3 and C4 as hereinafter explained in conjunction with FIG. 5. Clock oscillator 54 receiving driving signals from an oscillator 53. One of the clock signals, here illustrated as C1, is applied to a binary frequency generator 55 which provides a plurality (seven as here illustrated) of binarily related frequencies $bf_1$–$bf_7$ where the pulses of each frequency are non-coincident with the pulses of the other frequencies. Binary frequency generator 55, in a preferred form, comprises a uni-directional serial pulse counter having a plurality of bi-stable devices and logic means to detect the occurrence of a non-carry, that is, when a stage of the counter changes from binary "0" to binary "1." Thus, a $bf_1$ pulse will occur every second clock cycle, a $bf_2$ pulse will occur every fourth clock cycle, a $bf_3$ pulse will occur every eighth clock cycle, etc.

Table I shows the number of $bf_1$–$bf_7$ pulses which will occur during one hundred twenty-eight clock cycles.

TABLE I

| | |
|---|---|
| $bf_1$ | 64 |
| $bf_2$ | 32 |
| $bf_3$ | 16 |
| $bf_4$ | 8 |
| $bf_5$ | 4 |
| $bf_6$ | 2 |
| $bf_7$ | 1 |
| Clock cycles | 128 |

In the following description reference will be made to various "pulse frequencies." These pulse frequencies are measured as a number of pulses in a number of clock cycles and do not necessarily relate to a constant repetition rate usually expressed as cycles/second.

The $bf_1$–$bf_7$ pulse frequencies or selected ones thereof are applied to a frequency controller 56 which comprises a means for gating selected ones of pulse frequencies $bf_1$–$bf_7$ therethrough to provide a selectable pulse frequency $f_1$. Pulse frequency $f_1$ is applied as enabling pulses to add gates 48. The application of $f_1$ pulses to add gates 48 enables the gates 48 to pass the numerical content of feedrate number storage register 47 to parallel adder 49. The feedrate number in binary form is thus added to the number in parallel adder 49 a number of times and at a rate determined by pulse frequency $f_1$. The parallel adder will thus produce an overflow pulse frequency $f_2$ which has a repetition rate proportional to the feedrate number FRN and the repetition rate of pulse frequency $f_1$. Pulse frequency $f_2$ is then passed to a command pulse generator 60 here illustrated as having eighteen binary stages. Command pulse generator is basically a uni-directional binary counter and further includes logic for detecting non-carries to provide eighteen binarily-related pulse frequencies. Command pulse generator has the counting portion thereof preset with binary "1's" in the most significant positions thereof determined by the length of the block of information upon which it is then operating. Command pulse generator is preset from length of block logic section 39c of the input in temporary storage section 39. The command pulse generator output frequencies are then applied to non-carry pulse coincidence gates for each axis. Each of the blocks indicated by reference numerals 61, 62 and 63 comprise eighteen coincidence gates adapted to pass selected ones of the pulse frequencies from command pulse generator 60 when enabled by a binary "1" notation in a corresponding binary position of an associated axis command storage register. In the example given, the most significant position of an axis distance command gates the largest pulse frequency of command pulse generator 60. In this manner a number of command pulses are derived for each axis of motion which are equal to the binary movement command for that axis, and the command pulses derived are produced at a rate proportional to pulse frequency $f_2$, which is counted by command pulse generator. The pulse frequency outputs $f_x$, $f_y$ and $f_z$ of each of the non-carry pulse coincidence gates 61, 62 and 63 are applied to sign logic elements 44, 45 and 46, respectively, which determine the direction of motion of a controlled part with respect to each reference path. The $f_x$, $f_y$ and $f_z$ pulse frequencies are then applied to appropriate servos at either a positive or negative input. A positive input signifies that the servo system is to move its controlled object in a positive direction along its path of movement. A negative input signifies that the servo system is to move its controlled object in a negative direction along its path of movement.

Figure 2A:
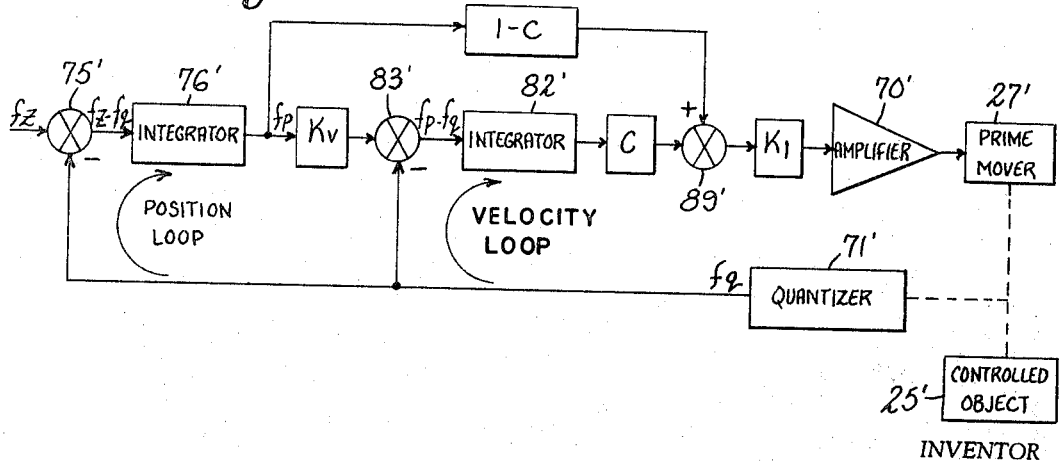
FIG. 2a is a functional diagram of the servo system of FIG. 2 and aids in functionally explaining the operation thereof.

Reference is now made to FIG. 2a which aids in an explanation of the features of the servo system of FIG. 2. FIG. 2a shows a functional development of the system of FIG. 2. In FIG. 2a the command pulse frequency $f_z$ is applied to a summing device 75' at a rate indicative of the commanded velocity of the controlled part, bed 25. The feedback pulse frequency $f_q$ is also applied to summing device 75' at a rate indicative of the actual velocity of the controlled part. The algebraic summation of the $f_z$ and $f_q$ pulses produces a velocity error $f_z-f_q$ which is the numeric count summed by an integrator 76' corresponding to error register 76 and associated number-to-frequency converter. The algebraic summation of $f_z$ and $f_q$ pulses is in effect an integration of the servo system velocity error which results in a numerical magnitude representing the system position error. This position error is then converted to a pulse frequency $f_q$ proportional to the position error. The repetition rate of pulse frequency $f_p$ thus represents a velocity that is a function of the system position error.

Then $f_p$ pulses are algebraically summed with $f_q$ pulses at summing device 83'. This results in a pulse frequency $f_p-f_q$ which is proportional to the required velocity change to eliminate the velocity error. The pulse frequency $f_p-f_q$ could be utilized to control the prime mover 89 directly to minimize the system velocity error. In the disclosed servo system the same quantizer is utilized to establish both the position and velocity loops.

The pulse frequency $f_p-f_q$ is statically stored as a number in integrator 82' and this number is converted to a pulse frequency $f_v$. Pulse frequencies $f_p$ and $f_v$ are summed by a summing device 89 and applied to amplifier 70' to control operation of prime mover 27'.

In FIG. 2a, the block indicated as $K_v$ represents the velocity lag constant of the system, and the block indicated as $K_1$ represents the gain of the velocity loop. The blocks indicated as C and 1–C represent the relative weights given $f_p$ and $f_v$ at summing device 89'. As will hereinafter be explained summing device 89' may be made a portion of the overall arrangement of amplifier 70 and these relative weights may be made variable.

It may be seen that as the quantity C approaches zero the inner or velocity loop is opened and the system approaches one of the first order. Values of C greater than zero, but less than one, may produce variable values of the position loop gain without affecting the velocity lag constant $K_v$. When C is equal to one, the system becomes a normal second order system with a gain of $K_vK_1$.

In a servo system of the type described the velocity lag constant and the velocity gain constant present opposing requirements. The velocity lag constant which is the gain of the outer or position loop influences the transient response of the system. The ability to control the position loop gain, which affects transient response, without affecting the velocity lag constant $K_v$ is extremely valuable in optimizing system performance. A preferred technique of accomplishing such adjustment is explained hereinafter in conjunction with servo amplifier 70.

CIRCUIT ELEMENTS

Figure 3A:
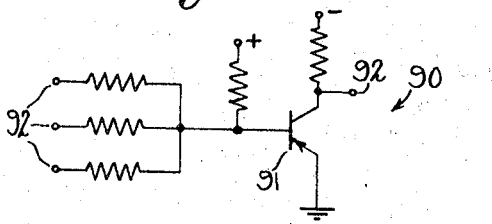
FIGS. 3a and 3b are diagrams illustrative of a logical circuit element which may be utilized in various components comprising a system embodying the invention.
Figure 3B:
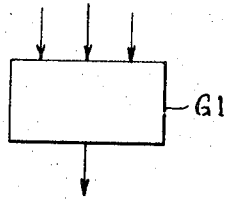

In a preferred form of the invention, as will hereinafter be described, the various components thereof are preferably constructed from the well-known NOR circuit, illustrated schematically in FIG. 3a. NOR element or circuit 90, as illustrated, comprises a PNP transistor 91, in a grounded emitter configuration, having a plurality of inputs 92 to the base thereof. As will be apparent from FIG. 3a there will be an output voltage (negative) at the collector 92 of transistor 91 whenever there is no negative input signal to the base of transistor 91. If there should be a negative input of sufficient magnitude to the base of transistor 91 the transistor will switch on and the collector will then go to ground. When transistor 91 is cut off the collector will essentially be at the supply voltage. All NOR elements hereinafter illustrated are operated in a switching mode. When transistor 91 is in a conductive state this may be considered a "0" output and when it is cut off it may be considered to have a "1" output. In the circuits hereinafter explained the NOR circuit of FIG. 3a will be illustrated as shown in FIG. 3b which is designated as gate G1. FIG. 3b illustrates the NOR element as it is used as an OR gate or merely for purposes of inversion. When the NOR element is used as an "AND" or coincidence gate a dot will be placed in the middle of the block forming gate G1. It will be apparent that the NOR element will provide a "1" output when all of the inputs thereto are "0."

The NOR elements may be utilized to provide bi-stable devices 94 as illustrated in FIG. 4a. For simplicity of illustration the bi-stable flip-flop 94 of FIG. 4a is hereinafter illustrated as shown in FIG. 4b and designated as memory M1 or as shown in FIG. 4c and designated memory M2. The operation of these bi-stable devices is well known to those skilled in the art and no description of such operation need be made here. It will be understood, of course, that the particular circuit elements here shown are set forth only to disclose a preferred embodiment of the invention. As shown in FIGS. 4b and 4c the input designated by the letter C represents a clock pulse which may be applied to either side of the flip-flop for setting or resetting. In many instances a memory or gate will be shown as having a multiplicity of inputs which could not be practically achieved in a single transistor. In such instances it will be understood that a plurality of NOR elements may be arranged in parallel to provide the necessary circuit component.

The timing of the operation and sequence of events of the interpolation and servo systems is controlled by clock pulses, C1, C2, C3 and C4 which are graphically illustrated in FIG. 5. The clock pulses vary between "0" voltage and a predetermined negative voltage hereinafter referred to as a "1" voltage level. Each clock pulse consists of a short pulse of one voltage level followed by a longer pulse of the other voltage level. The operating portion of each clock pulse is the short pulse portion. As will hereinafter be made apparent the odd clock pulse C1 and C3 are utilized primarily to reset bi-stable devices hereinafter referred to as memories, while the even clock pulses C2 and C4 are used primarily for gating purposes. Each clock cycle which consists of the four clock pulses, C1, C2, C3 and C4 is uniform in time and continuously repetitive when the system is in operation. Clock oscillator 54 is described in detail in the aforementioned co-pending application of Johann F. Reuteler.

SERVO SYSTEM COMPONENTS

The components of servo system of FIG. 2 will now be described in detail sufficient to disclose the operation thereof. The details of construction vary in some respects from the system diagram of FIG. 2 and such differences will hereinafter be pointed out, if not made apparent.

Reference is now made to sample control register 78, illustrated schematically in FIG. 6. The function of sample control register 78 is to provide a plurality of gating signals $sg_1$–$sg_8$ which sequentially occur every one-half clock cycle commencing every thirty-second clock cycle and are initiated by a $bf_5$ pulse from binary frequency generator 55. Sample control register 78 also provides resetting signals $rs_1$–$rs_8$ for bi-stable elements in sample logic 77 every one-half clock cycle, commencing with every thirty-second clock cycle and initiated by a $bf_5$ pulse from binary frequency generator 55. In the illustrated embodiment, sample control register 78 comprises a plurality of pulse generating stages, three of which are illustrated in FIG. 6.

Every thirty-second clock cycle upon occurrence of a $bf_5$ pulse gate G2 is enabled at C4 to provide a setting signal to memory M3. The "1" output of gate G2 also provides a resetting signal $rs_1$. When the output of gate G2 sets memory M3, the left side of memory M3 has a "0" output and one-half clock cycle later at C2 gate G3 supplies a resetting $rs_2$. The signal $rs_2$ also sets the left side of memory M4 which then has a "0" output and one-half clock cycle later at C4, gate G4 supplies another resetting signal $rs_3$. The output signal from gate G4 also sets memory M5. The remaining stages of the sample control register 78 are similar to stages 78a, 78b and 78c, illustrated in FIG. 6, and provide sequentially every half clock cycle resetting signals $rs_4$–$rs_8$.

Each of the stages of the sample control register also provides a sample gating signal each half clock cycle. When memory M3 of stage 78a is reset at C3 the output of the right side of memory M3 goes to "0" and is applied to an inversion gate G5 which yields a "0" gating signal except when memory M3 is reset by C3. It may thus be seen that when gate G2 sets memory M3 and provides a resetting signal $rs_1$, gate G5 will supply a "0" level gating signal $sg_1$. In a similar manner in stage 78b, gate G6 provides a "0" gating signal $sg_2$ at the same time gate G3 provides resetting signal $rs_2$. Also, stage 78c provides a gating signal $sg_3$. The gating signals $sg_1$–$sg_8$ occur sequentially every one-half clock cycle commencing every thirty-second clock cycle. The resetting signals $rs_1$–$rs_8$ and the gating signals $sg_1$–$sg_8$ are utilized as hereinafter explained.

Reference is now made to FIG. 7 which illustrates in more detail the operation of pulse adder 75, error register 76, sample logic 77, number-to-frequency converter 79 and sign logic 79a, shown in block form in FIG. 2. Error register 76 comprises a binary bi-directional counter having eight stages 76a–76h and a directional sign element or stage 76i. As illustrated, the least significant bit is held in stage 76a and the most significant bit is held in stage 76h. The bi-directional counter receives either incrementing or decrementing pulse inputs from pulse adder 75. In a preferred embodiment, as hereinafter described, pulse adder is constructed integral with stage 76a. The pulse adder 75 receives command and feedback pulses and provides the pulses of frequency $f_z$–$f_q$ to error register 76. This pulse frequency $f_z$–$f_q$ is the servo system velocity error.

Every thirty-second clock cycle under the control of sample control register 78 the number held in binary form in register 76 is sampled and held in sample storage memories M6–M14 each of which store the bit of a corresponding stage 76a–76i, respectively. Memories M6–M14 are reset by the resetting signals $rs_1$–$rs_8$ derived from sample register 78, previously explained. Sample memories M6–M14 are set by the outputs of gates G8–G16, respectively, every thirty-second clock cycle when enabled by one of gating signals $sg_1$–$sg_8$ at a gating clock pulse C2 or C4. When sampling occurs every thirty-second clock cycle memories M6–M14 are sequentially reset every one-half clock cycle and then sequentially set (dependent on the presence of a bit in an associated register stage) by a signal from an associated one of gates G8–G15. In operation, upon occurrence of a $bf_5$ pulse memory M6 is reset at C4, simultaneously an $sg_1$ gating signal is applied to gate G8. However, gate G8 cannot apply a setting signal to memory M6 until C2. Memory M7 is reset at the same C2 pulse which enables gate G8. However, gate G9 cannot set memory M7 until the following C4 pulse.

As will hereinafter be explained a "borrow" or "carry" bit propagating through the stages of error register 76 propagates at a rate of one stage every half clock cycle. It may thus be seen that the sequential sampling of the stages of error register 76 occurs at the same time as the time of propagation of an increment or decrement therethrough. The function of the sample logic and sampling control is to store the information in error register 76 in a static storage at a time when no carries or borrows are propagating through the stage of the counter being sampled.

The binary number held in static storage in sample logic 77 is converted to a pulse frequency $f_p$ having a number of pulses proportional to the numerical content of the sample memories. This number-to-frequency conversion is accomplished through the provision of coincidence gates G17–G25 and binary frequency generator pulse frequencies $bf_1$, $bf_2$, $bf_3$, $bf_4$ and $bf_5$. Pulse frequency $f_p$ is actually comprised of two pulse frequency components $f_{pc}$ and $f_{pf}$. Pulse frequency $f_{pc}$ is termed the coarse position error pulse frequency, while $f_{pf}$ is termed the fine position error pulse frequency. Pulse frequency $f_{pc}$ is derived from the bits in the four higher order stages of register 76 while pulse frequency $f_{pf}$ is derived from the bits in the four lower order stages. The reasons for division of pulse frequency $f_p$ into two components is hereinafter made apparent.

Let it be assumed that all of sample memories M10–M13 are set in a condition indicative of a binary "1" in counter stages 76e, 76f, 76g and 76h and that sign memory M14 is set in a condition indicating that the numeric representation in register 76 is positive. Then gates G25, G24, G23, G22 and G21 will pass frequencies $bf_1$, $bf_2$, $bf_3$, $bf_4$, and $bf_5$, respectively. These frequencies $bf_1$–$bf_5$ are then summed in an OR gate 95 to provide pulse frequency $f_{pc}$ a component of pulse frequency $f_p$. Dependent upon the commanded direction of movement, that is, positive or negative directions, a component of pulse frequency $f_{pc}$ will pass through one of gates G28 or G29 to an appropriate input of servo register 82, or more specifically, pulse adder 83. If the number held in counter 76 is positive, memory M14 will be set in a state indicative thereof and will enable gate G25 to pass the highest order frequency $bf_1$ which occurs every other clock cycle. Therefore, when the sampled content of error register 76 is positive, pulse frequency $bf_1$ will present in the output of OR gate G27. However, when the sign logic stage 76i is sampled and it is determined that the numerical content of error register 76 is negative then memory M14 will inhibit gate G25 and pulse frequency $bf_1$ will not be present in the output of OR gate G27.

It is the presence or absence of pulse frequency $bf_1$, which occurs every other clock cycle, in the output of OR gate G27 which indicates the algebraic sign of the numerical content of error register 76. The pulse output $f_{pc}$ of OR gate 95 is applied to coincidence gates G28 and G29 which are selectively enabled by sign memory M14 dependent upon the state thereof which in turn is dependent upon the information received from sign logic stage 76i of error register 76. The pulse frequency $f_{pc}$ is applied directly to servo amplifier 70 through a pulse shaper. Also, pulse frequency $f_{pc}$ is applied to gates G28 and G29 prior to application to servo register 82. As will hereinafter be explained, the frequency component $bf_1$ is removed from the pulse frequency outputs of gates G28 and G29 which are designated $+f_{pc}'$ and $-f_{pc}'$, respectively.

OR gate 96 provides an output pulse frequency $f_{pf}$ which is designated the fine position error frequency output. Frequency $f_{pf}$ is a summation of the pulses received through gates G17, G18, G19 and G20 which are enabled by sample memories M6, M7, M8 and M9, respectively. Gates G17, G18, G19 and G20 when enabled pass pulse frequencies $bf_5$, $bf_4$, $bf_3$, and $bf_2$, respectively. From a pulse rate standpoint in relation to the significance of the binary digits in stages 76a, 76b, 76c and 76d of error register 76 the fine pulse frequency $f_{pf}$ is increased by a factor of sixteen.

The purpose of raising the frequency of the fine pulses $f_{pf}$ by $2^4$ is to decrease the spacing between pulses of the resultant $f_{pc}$ pulse frequency from gate 96 when this pulse frequency is applied to the servo amplifier. This increase in the frequency of the $f_{pf}$ pulses is subject to later compensation as hereinafter described. The increase in the frequency of $f_{pf}$ while preferred is not absolutely essential.

From the foregoing discussion it is apparent that the numerical content of error register 76 is converted into a pulse train ($f_{pc}'+f_{pf}$) having a number of pulses proportional to the number held in error register 76 in binary form, and is also converted into a pulse frequency.

Reviewing briefly, the function of error register 76 is to integrate the velocity error which is a pulse frequency $f_z-f_q$. The result of this integration is the numerical count in the register which represents the difference between commanded position and actual position. The total number of pulses produced from OR gates 95 and 96 are proportional to this magnitude of the error. Incrementing or decrementing pulses from pulse adder 75 are introduced only into the least significant bit stage of the error register, carries or borrows are propagated to the adder in a manner known in the operation of a bi-directional counter. As will hereinafter be explained in more detail sign logic stage 76i comprises a bi-stable or memory device which is normally set to indicate a positive count in the error register. However, when the numerical content of the register is representative of a negative error, a borrow is immediately propagated along the stages of the error register which sets the sign memory to a state indicative of a negative error. The sign logic stage 76i will then cause gate G25 to be inhibited and pulse frequency $bf_1$ will not be present in the output of gate G27. To illustrate the manner in which the presence or absence of pulse frequency $bf_1$ determines the direction of the error, reference is made to Table II.

TABLE II

| Error register content | Arabic | Binary | f¢0²512 clock cycles |
|---|---|---|---|
| Condition 1 | 0 | 00000000 | $bf^1=256$ |
| Condition 2 | 176 | 10110000 | $bf^1+bf^{(2}+bf^4+bf^5)=432$ |
| Condition 3 | −176 | 1 −01010000 | $bf^3+bf^5=80$ |

¹ Complemented.

At Condition 1 the numerical error in register 76 is zero. Under such conditions sample sign memory M14 will be set to show a positive mode of operation and pulse frequency $bf_1$ will be gated to OR gate 95 through coincidence gate G25 every other clock cycle at C4. Pulse frequency $f_{pc}$ will then consist solely of pulse frequency $bf_1$ and will be applied to servo amplifier 70 through pulse shaper 81, FIG. 2. Assume now that a positive error of one hundred seventy-six exists at Condition 2. Under such conditions stages 76e, 76f, and 76h of error register 76 will be set to denote a binary "1" and sign logic stage 76i will be set to denote a positive error. Therefore, the output of OR Gate 95 will be the sum of $$bf_1+(bf_2+bf_4+bf_5)$$

or four hundred thirty-two pulses in a time of five hundred twelve clock cycles. The difference here between the output of OR gate 96 which is $f_{pc}$ and $bf_1$ is one hundred seventy-six pulses.

Now assume the error register 76 returns to a numerical content of zero and decrementing pulses are applied thereto until the numerical error denoted therein is minus one hundred seventy-six. By virtue of inherent construction of a binary bi-directional counter as will hereinafter be exemplified, this minus error will be denoted as the complement of an identical positive error and error register stages 76e and 76g will be set to denote the presence of a binary "1." However, in establishing this binary representation of a negative error a "borrow" has propagated to sign logic stage 76i which through gate G16 at the next sampling time sets sample sign memory M14 in a state indicative of a negative error. The output of the left side of memory M14 will then inhibit gate G25 and prevent passage of pulse frequency $bf_1$ therethrough. Therefore, the output $f_{pc}$ of OR gate 95 will be the sum of $bf_3$ plus $bf_5$ passed through gates G22 and G23. In this instance the $-f_{pc}$ pulses from gate G29 will total eighty in a time of five hundred twelve clock cycles. From an inspection of Table I it will be noted that $f_{pc}$ pulses for a given positive numerical error will bear a similar absolute relationship to pulse frequency $bf_1$ as the same negative numerical error. In the example given, the $f_{pc}$ pulses total one hundred seventy-six greater than $bf_1$ in the stated number of clock cycles while the $-f_{pc}$ pulses are one hundred seventy-six less than the $bf_1$ pulses in the stated number of clock cycles.

The presence or absence of pulse frequency $bf_1$ in pulse frequency $f_p$ thus establishes the sign of the numerical representation of the position error in error register 76. At this point it is apparent that the summation of the position command pulses $f_z$ and the actual position pulses $f_q$ in error register 76 comprises an integration of the velocity error. The subsequent conversion of the position error number in register 76 to a pulse frequency $f_p$ provides a pulse frequency representing a velocity error proportional to the position error. This velocity signal is then utilized as will hereinafter be explained.

Reference is now made to FIG. 8 which illustrates schematically the first stage 76a of the bi-directional counter forming error register 76, including pulse adder 75.

Stage 76a is arranged to receive four pulse inputs $f_z$, $f_q$, $-f_z$, and $-f_q$ pulses. Stage 76a generally comprises an incrementing portion shown above the broken line and a decrementing portion shown below the broken line. The elements of the two portions are substantially identical in construction and function, and elements in the decrementing portion corresponding to those of the incrementing portion bear the same identifying reference numeral primed.

In the increment portion $f_z$ command pulses are applied to memory M16 and $-f_q$ pulses are applied to memory M17. If an $f_z$ and a $-f_q$ pulse are both received in the same clock cycle, gate G33 senses this simultaneous receipt and then sets memory M19. When memory M19 is set it indicates that two incrementing pulses have been received during the same clock cycle and therefore a carry pulse must be forwarded to the next stage of the counter. Gate G34 senses the set condition of memory M19 and forwards the carry pulses to stage 76b. When gate G33 senses that two incrementing pulses have been received during the same clock cycle it also resets memory M18. Memory M18 is referred to as the incrementing memory of stage 76a. Memory M18 is set every clock cycle at C1 to a state indicative of the presence of an incrementing input. However, if there has been no incrementing input at C2 it is reset by gate G32. Gate G32 senses when there has been no incrementing input to either memory M16 or M17 and resets M18 in response thereto. If memory M18 is not reset at C2 it is indicative of the fact that a single incrementing pulse has been received by either M16 or M17.

Memory M20 functions to hold an error bit which is presently in the stage for one-half of a clock cycle. If an error bit is presently in the stage as indicated by a set condition of memory M20 and memory M18 is set to a condition indicative of receipt of one incrementing pulse, gate G35 senses the contents of memory M18 and M20 and in response thereto forwards an incrementing pulse to the incrementing memory of next higher order stage 76b. At the same time the output of gate G35 resets memory M20' which is the complement of memory M20. Memory M20' holds an error bit presently in the stage during the second or decrementing half of a clock cycle. If gate G35 resets memory M20' it is indicative of the fact that the contents of memory M18 and memory M20 have been added to produce a carry bit to the next stage and no sum bit remains. Gate G36 senses the condition existing when there is no incrementing bit in memory M18 and when no error bit is present in memory M20 thus indicating there is no bit, either incrementing or present error, in the incrementing portion of stage 76a. When gate G36 senses the absence of an increment and an error bit, it resets memory M20'.

Reference is now made to the decrementing portion of the stage. Decrementing pulses $-f_z$ or $f_q$ are applied to memories M16' and M17', respectively. The condition or stage of memories M16' and M17' is sensed by gates G32' and G33'. However, a delay network comprising memories M21 and M22 and associated gates G37 and G38, respectively, are interposed therebetween to provide a one-half clock cycle delay. When both a $-f_z$ and a $+f_q$ pulse are received during the same clock cycle, memories M21 and M22 will be set to a state indicative of such receipt at C2. At C4, gate G33 will sense the receipt of two decrementing pulses and set memory M19' in response thereto. Then on the following C2 pulse, gate G34 will forward a decrement or "borrow" to the decrement memory of the next higher order stage 76b. Memory M18' is the decrementing memory of stage 76a. At clock pulse C3 memory M18 is set to a state indicative of receipt of one decrementing input. On the following C4 clock pulse, memory M18' is reset by gate G33', if two decrementing pulses have been received or by gate G32' if no decrementing pulses have been received. If a single decrementing pulse, either $f_q$ or $-f_z$ is received gate G32' is inhibited and memory M18' is not reset.

As previously stated memory M20' holds an error bit presently in the stage, if in the stage, during the decrementing one-half of a clock cycle. Memory M20' is set every clock cycle at C3 to a state indicative of the existence of an error bit in the stage and remains in that condition unless reset by one of gates G35 or G36 on the following C4 clock pulse. Assume that memory M20' was not previously reset by gates G35 and G36. This indicates that an error bit is held in memory M20'. Further assume that memory M18' has been reset thus indicating that there is no decrement stored therein. Under such conditions, gate G35' will be inhibited. However, gate G36' will sense the error bit held in memory M20' and further sense that memory M18' holds no error bit. Upon sensing these conditions gate G36' will apply a signal to memory M20 to set it in a state indicative of an error bit presently in the stage. Assume during the next clock cycle memory M18 is set to a condition indicative of receipt of one incrementing input, gate G35 will sense the present error in memory M20 and the incrementing input in memory M18 and in response thereto will forward a "carry" or incrementing pulse to the incrementing memory M23 or stage 76b. At the same time gate G35 at C4 resets memory M20' to a state which indicates that there is no error presently in the stage.

At this time assume that a decrementing input is received by stage 76a. At clock pulse C3 memory M18' will be set indicating that a decrementing pulse is present. Due to the fact that a decrementing pulse has been received neither gate G32' nor gate G33' will reset memory M18'. Therefore, the binary "1" bit in memory M18' must be subtracted from the "0" in memory M20. It is known from the rules of binary arithmetic that the result of such subtraction will be retention of an error bit in stage 76a and a decrement or "borrow" pulse to stage 76b. Gate G35' senses that memory M20' is in a reset or "0" condition and that memory M18' is in a set or "1" condition and in response thereto will forward a borrow pulse to decrement memory M24 of stage 76b, and simultaneously set memory M20 to a state indicative of a present error bit of "1."

From the foregoing, the operation of stage 76a which includes the function of pulse addition is now apparent. The summing function of stage 76a effectively produces a pulse frequency $f_z - f_q$ which represents a system velocity error.

Attention is invited to the fact that the quantizer pulses applied to servo register 82 and also those applied directly to servo amplifier 70 are taken from stage 76a of error register 76. Negative $f_q$ pulses derived from the left side of memory M17 every time memory M17 is reset and positive $f_q$ pulses derived from memory M22 each time a $f_q$ pulse is applied to memory M17' are applied directly to servo amplifier 70 as hereinafter explained. Negative $f_q$ incrementing pulses are applied to servo register from gate G31 at C2 responsive from $-f_q$ pulses by memory M17. Positive $f_q$ decrementing pulses are applied to servo register 82 at clock pulse C2 from gate 38 which senses whenever memory M17' is set by a positive $f_q$ pulse.

FIG. 8 also illustrates a portion of the sample logic circuit 77. When sample gating signal $sg_1$ is received, sample gate G8 is enabled at C2 to sense an error bit in memory M20′. If gate G8 is enabled it applies a setting signal to memory M6, FIG. 7.

Reference is now made to FIG. 9 which illustrates the second stage 76b of error register 76. Stage 76b comprises four memories M23, M24, M25 and M26 and gates G39, G40, G41, G42. Memory M23 is the increment memory of stage 76b and receives incrementing pulses from either of gates G35 or G36 of stage 76a. Memory M24 is the decrement memory of stage 76b and receives decrementing or borrow pulses from gate G35′ or gate G36′ of stage 76a. Memories M25 and M26 ultimately hold the error bit presently in stage 76b for a half clock cycle each. Gates G39 and G40 at clock pulse C2 will add the contents of memory M25 and any carry bit received by memory M23. If memory M25 presently contains an error bit and a carry signal is received by memory M23 gate G38 will forward a carry pulse to stage 76c. Assuming that there is an error bit stored in memory M25 and no carry is received by memory M23 at clock C2 gate G40 will transfer the bit in memory M25 to memory M26. Gates G41 and G42 will then subtract a borrow bit in memory M24, if present, from the error bit in memory M26. If a borrow bit is present in memory M24, gate G41 would then forward a borrow to stage 76c and simultaneously reset memory M25. If no borrow has been received from stage 76a and memory M24 does not receive a decrementing pulse from gate G35′ or G36′ gate G40 will transfer at clock C4 the error bit, if present, in memory M26 back to memory M25.

At C4 when sample gate signal $sg_2$ is present the contents of memory M26 is sampled to determine if an error bit is present in stage 76b. If upon occurrence of sampling gate signal $sg_2$, gate G9 senses the existence of an error bit in memory M26, gate G9 sets sample memory M7. When sample memory M7 is set it enables gate G18 at clock pulse C4 to pass a $bf_4$ pulse to fine error "OR" gate 96, previously illustrated in FIG. 7.

Stages 76c–76h of error register 76 are the same as disclosed in FIG. 9 as are the sample gating and logic circuits associated therewith. For further clarity of disclosure stage 76h, the most significant bit position of register 76 and sign logic stage 76i will now be described in conjunction with FIG. 10.

Stage 76h comprises an increment memory M27 which receives a carry pulse, if present, from stage 76g, a decrement memory M28 which receives a borrow pulse, if present, from stage 76g, error bit storage memories M29 and M30, a pair of add gates G42 and G43 and a pair of subtract gates G44 and G45.

Associated with stage 76h is sample memory M13 which is resent from sample control register 78 by reset signal $rs_8$ and then set by a following sample gating signal $sg_8$ from gate G15 if gate G15 senses a binary "1" error bit in memory M30. If memory M13 is set by sample gate G15 it will enable gate G24 to pass $bf_2$ pulses to OR gate 95.

Sign logic stage 76i comprises a sign memory M31 which is set by gate G42 to indicate that the error in error register 76 is positive and is reset from gate G45 to indicate that the numerical error in error register 76 is negative. A delay circuit comprising memory M32 and gate G46 is interposed between gate G45 and memory M31 to delay a borrow signal one-half clock cycle so that a borrow to memory M31 does not occur during a sampling function. Memory M31 is normally set. To explain the manner in which memory M31 is reset to indicate a numerical negative error in register 76, assume that a borrow from stage 76g sets memory M28 and the contents of memory M28 must be subtracted from memory M30 which contains a binary "0." In binary subtraction it will be recalled that when "1" is subtracted from "0" the result is a binary "1" with a borrow from the next higher order stage. If memory M30 contains a binary "0" all of the inputs to gate G45 at C4 will be "0," the output of gate G45 will be "1." This sets delay memory M32 and at C2 delay gate G46 will reset memory M31 if memory M27 has not received a carry from stage 76g. Memory M31 will now be in a state indicative of a negative numerical error in error register 76, and will remain in such state until the counter is incremented to zero and set by gate G42. Sample gate G16 will then be enabled by sample gating signal $sg_8$ to set sample sign memory M14 to a state indicative of a negative numerical error in error register 76. The outputs of memory M14 will then inhibit gate G28 and enable gate G29. Therefore, the output pulse frequency $f_{pc}$ from OR gate 95 appears on the minus or negative output line. The output of the left side of memory M14 which is a "1" will also inhibit gate G25 and prevent inclusion of pulse frequency $bf_1$ in the output pulse frequency $f_{pc}$.

If memory M31 should be set to indicate a positive error sample gate G16 could not set memory M14 and the "1" output of the right side of memory M14 would inhibit gate G29. Also, the left side of memory M14 would then enable gate G25 and allow the application of pulse frequency $bf_1$ to OR gate 95 which is comprised of a memory M33 having as its inputs pulse frequencies $bf_1$, $bf_2$, $bf_3$, $bf_4$ and $bf_5$, from gates G25, G24, G23, G22, and G21, respectively.

The output of the left side of memory M33 is applied to gate G28. For gate G28 to be enabled it must sense from memory M14 that a positive numerical error exists in error register 76, memory M33 is set, a signal $bf_1'$ is present, and clock pulse C2 occurs. The signal $bf_1'$ is derived from $bf_1$ and occurs in between occurrence of $bf_1$ pulses. As will be apparent this signal $bf_1'$ may be obtained by delaying a $bf_1$ signal for one-half clock cycle, it being understood that $bf_1$ occurs every other clock cycle.

The pulse outputs of gates G28 and G29 are applied to incrementing and decrementing inputs of servo register 82 as will hereinafter be described. It is apparent that the presence of the $bf_1$ signal in the output taken directly from memory M33 at line L10 indicates the sign of the error. However, it is not desired to have the $bf_1$ component present in the output of gates G28 and G29. The pulse frequency $bf_1'$ effectively subtracts $bf_1$ from the output of OR gate 95 by opening gates G28 and G29 only every other clock cycle when memory M33 has not been influenced by $bf_1$.

It is readily apparent when the numerical error in register 76 is positive that gate G28 will be enabled each time a $bf_2$, $bf_3$, $bf_4$ or $bf_5$ pulse sets memory M33. This is seen from consideration of Table II where there was a positive error of one hundred seventy-six. In this case one hundred seventy-six pulses are passed by gate G28 in five hundred twelve clock cycles.

However, when the error is negative only $bf_3$ and $bf_5$ pulses (eighty) are applied to memory M33 during five hundred twelve clock cycles. For a true pulse representation of the same numerical error one hundred seventy-six pulses must be passed or produced by gate G29. Gate G29 will produce the required one hundred seventy-six pulses, as now explained.

Memory M33 is reset every clock cycle at C3. Therefore, in the five hundred twelve clock cycles memory M33 could potentially enable gate G29 every clock cycle. But $bf_1'$ inhibits gate G29 every other clock cycle so memory M33 can only enable gate G29 two hundred fifty-six times. However, memory M33 in this time will be set eighty times at C4 upon receipt of $bf_3$ and $bf_5$ pulses. When memory M33 is set at C4 there is only a "0" input to the right side thereof and the output of the right side thereof has a "1" output at the following C2 pulse which inhibits gate G29. Therefore, pulse frequency $-f_{pc}'$ will have a number of pulses (one hundred seventy-six) equal to the negative numerical error in register 76.

The pulse outputs $f_{pn}'$ and $f_{pc}'$ of gates G28 and G29 are applied to the least significant bit stage of servo register 82, FIG. 11, as are positive and negative $f_q$ pulses. The fine error output pulses $f_{pf}$ which have been raised in quantity by a factor of sixteen are applied to a four-stage uni-directional pulse counter 98. Therefore, when counter 98 receives sixteen fine error pulses $f_{pf}$ it will apply one incrementing pulse to input stage 82a of servo register 82. This input pulse from counter 98 has the same effect as a positive coarse error pulse $f_{pc}$. Servo register 82 is constructed in the same manner as error register 76 and comprises eight numerical stages, 82a–82h plus a sign logic stage 82i.

The structure of servo register 82, sample logic 84 and number-to-frequency converter 85 as shown in FIG. 11 is seen to be substantially identical to servo register 76, sample logic 77 and number-to-frequency converter 79 shown in FIG. 7. In sample logic 84 gates G48–G56 are provided to sample the contents of servo register stages 82a–82i, respectively, every thirty-two clock cycles. When any of the gates G48–G56 sense that an associated stage of error register 82 contains a binary "1" digit it sets an associated memory M35–M43. If the memories M35–M43 are set they enable gates G57–G65, respectively, to pass selected ones of $bf_1$–$bf_5$ pulses.

Pulse frequencies $bf_1$–$bf_5$ passed by gates G61–G65 are summed in an OR gate 99. The presence of pulse frequency $bf_1$ in this summation determines the algebraic sign of the numerical content of register 83 in the same manner as explained in conjunction with error register 76. The output of OR gate 99 is termed the coarse error servo register pulses $f_{vc}$. OR gate 100 sums the output pulses of gates G57, G58, G59, G60, G66 and G67, the last two mentioned gates being enabled by the presence of a binary "1" digit in the last two stages of uni-directional counter 98. It will be noted that the application of pulse frequencies $bf_1$–$bf_4$ to gates G60, G59, G58, G57, respectively, effectively, increases the weight of the fine error pulses $f_{vf}$ from OR gate 100 by a factor of $2^5$. The weight of the pulse frequency $f_{pf}$ will subsequently be diminished by a like factor as will hereinafter be explained.

SERVO AMPLIFIER

As thus far explained, eight pulse frequencies or trains have been derived in the servo system. These eight pulse frequencies are $+f_q$; $-f_q$; $f_{pf}$, the fine error pulses from number-to-frequency converter 79; $f_{pc}$, the coarse error pulses from number-to-frequency converter 79; $f_{pc}'$ and $-f_{pc}'$, the pulses representing the numerical content of error register 76; $f_{vc}$, the coarse error pulses and $f_{vf}$ the fine error pulses from number-to-frequency converter 85. These pulse frequencies, except $f_{pc}'$ and $-f_{pc}'$, are applied to identical pulse shapers 102, 103, 104, 105 and 88 which in the disclosed embodiment of the invention are part of servo amplifier 70, FIG. 12. The pulse shapers 102–105 and 88 are identical and function to shape the pulses received thereby into corresponding pulses of constant amplitude and pulse width. The details of one of the pulse shapers identified as pulse shaper 103 is shown in FIG. 13 and will hereinafter be described.

In FIG. 12 pulse shapers 102 and 103 correspond to pulse shaper 81 and pulse shapers 104 and 105 correspond to pulse shaper 86 of FIG. 2.

Pulse shaper 103, FIG. 13, will first be described. It comprises a transistor 107 connected between ground and a bus line 108, and a transistor 109 connected between bus lines 110 and 111. The potential of bus lines 108, 110, 111 and also 112 are set forth solely to enhance explanation of operation of the circuit. Resistors 113 and 114 which are of equal resistance value are in the collector circuit of transistor 107, and resistors 115 and 116 which also are of equal resistance values are in the collector circuit of transistor 109. A diode 117 is connected between the collector of transistor 109 and bus line 112 to clamp the collector of transistor 109 to a voltage value of no greater than 6.5 volts.

The pulse output $f_{pc}$ of memory M33, FIG. 10, is applied to the base of transistor 107 through terminal 119 and resistor 120. C3 clock pulses are applied to the base of transistor 107 through terminal 118 and resistors 121 and 122.

The sum of the value of resistors 121 and 122 is essentially double the resistance value of resistor 120. Resistor 123 is substantially greater in value than the sum of resistors 121 and 122. Resistors 123 and 126 are provided to back bias transistors 107 and 109, respectively. Capacitor 124 is provided to enhance the switching time of transistors 107 upon receipt of a C3 pulse. Capacitor 125 is provided to enhance the switching time of transistor 109. The voltage ouput from pulse shaper 103 is taken from point 127 between resistors 115 and 116 and is applied to point 161 of potentiometer 129, FIG. 12.

It may readily be noted that when transistor 109 is turned off the voltage at point 127 will be 10.25 volts. However, when transistor 109 is turned on the voltage at point 127 will be 4.0 volts. Transistor 109 is turned on when the voltage on the base thereof moves a sufficient distance in a positive direction. Transistor 109 may normally be considered to be turned off because of the negative bias thereon from resistor 126. When transistor 107 is turned on the voltage at the base of transistor 109 rises toward ground and transistor 109 switches on.

Transistor 107 will be turned on upon receipt of either a C3 clock pulse at terminal 118 which drops the potential at terminal 118 from "0" to $-14$ volts, or absence of an $f_{pc}$ pulse from memory M33 which raises the potential at terminal 119 to ground from $-14$ volts. It will be recalled that the $bf_1$–$bf_5$ pulses which set memory M33, FIG. 10, occur at a C4 pulse and the left side of memory M33 will have a "0" output until the following C3 clock pulse resets memory M33. In practice, the C4 pulses occur just prior to the end of a C3 pulse so there is a slight overlap therebetween.

The operation of pulse shaper 103 will be explained with reference to FIG. 14 which illustrates various pulse waveforms applied to terminals 118 and 119 of pulse shaper 103 and also waveforms appearing at point 127 under various operating conditions of the system. In FIG. 14, the pulse waveforms are shown as occurring in successive clock cycles CC1–CC5.

When transistor 107 is turned on the voltage of the collector thereof and also point 124 rises toward ground. This switches transistor 109 on and current flows from bus line 111 to bus line 110 producing a voltage with respect to ground of 4.0 volts at point 127. Transistor 107 will turn on if either of terminals 118 or 119 goes sufficiently negative. This may occur upon occurrence of a C3 pulse as shown in FIG. 14a, or when the output voltage of memory M33 is negative as shown in FIG. 14b. In FIG. 14a, C3 pulses are shown for each of successive clock cycles CC1–CC5. A C3 clock pulse has a duration of approximately five microseconds during a clock cycle of approximately twenty-five microseconds. A C4 clock pulse has a duration of approximately seven and one-half microseconds.

The voltage at terminal 118 due to C3 pulses will appear as shown in FIG. 14a, and when there is zero error in register 76 the voltage input to terminal 119 will appear as shown in FIG. 14b. In considering FIG. 14b and also memory M33, FIG. 10, it will be apparent under zero error conditions that a $bf_1$ pulse will set memory M33 every other clock cycle at C4 at which time the left side of memory M33 will have a "0" output until memory M33 is reset by the following C3 pulse. This will cause a voltage waveform as shown in FIG. 14c to be present at point 127. When transistor 107 and also transistor 109 are turned on the voltage at point 127 is 4.0 volts. However, when transistor 107 and transistor 109 are not turned on the voltage at point 127 will be 10.25 volts.

Assume now that the numerical error in register 76 is greater than zero and memory M33 produces an output pulse following the C3 pulse of clock cycle CC2, FIG. 14. The waveform of the voltage applied to terminal 119 will now appear as shown in FIG. 14d which will result in a voltage waveform at point 127 as shown in FIG. 14e.

Let it now be assumed that the numerical error in register 76 is negative or less than zero. As previously explained, there will be no $bf_1$ pulse component in the output of memory M33. If it is assumed that the error pulse under the conditions assumed appears immediately following the C3 pulse of clock cycle CC4, the voltage waveform at terminal 119 will appear as shown in FIG. 14f and the resulting voltage waveform at point 127 will appear as shown in FIG. 14g.

Referring back to FIG. 12, all of the shaped pulses except the quantizer pulses are combined by a summing device which is shown as a potentiometer 129.

The quantizer pulses $f_q$ and $-f_q$ from memories M22 and M17, FIG. 8, are applied to pulse shaper 88 through a directional logic network 128. Network 128 comprises a memory M49 and gates G68 and G69. Memory M49 applies a "0" or "1" level signal to pulse shaper 88 dependent upon the direction of motion of a controlled object with respect to its reference path. The resulting voltage waveform of pulse shaper 88 determines the voltage across potentiometer 156.

To examine the operation of network 128 assume that the controlled object is moving in a positive direction with respect to its reference path. Then $f_q$ pulses are applied to the right side of memory M17′ (at C4 as hereinafter explained). In response to $f_q$ pulses memory M22 is set at C2 through gate G38. The output of the left side of memory M22 then holds gate G68, FIG. 12, closed and a "0" signal is applied to the left side of memory M49.

At the same time memory M17 remains in a reset condition under the influence of C3 pulses since no $-f_q$ pulses are received. The input to gate G69 from memory M17 is "0" and at C2 gate G69 will set memory M49. Then memory M49 will apply a "0" level signal to pulse shaper 88, and a "0" signal to the left side of memory M49. Thus, memory M49 will remain in a set state until $-f_q$ pulses are applied to memory M17.

Assume now that the direction of travel of the controlled object is reversed, then $-f_q$ pulses are applied to memory M17 at C4. This causes the left side of memory M17 to apply a "1" signal to gate G69. Gate G69 will no longer apply a setting signal to memory M49.

Positive $f_q$ pulses are no longer applied to memory M17′, thus gate G38 has a "0" output and memory M22 applies a "0" signal to gate G68. Then at the following C4 pulse gate G68 resets memory M49 and memory M49 applies a "1" signal to pulse shaper 88.

Thus, when the direction of travel of the controlled object is positive with respect to its path of travel, memory M49 will apply a "0" signal to pulse shaper 88 and when the direction of travel is negative M49 will apply a "1" signal to pulse shaper 88. The structure and operation of pulse shaper 88 will be apparent from the discussion of pulse shaper 103.

The output of potentiometer 129 is utilized to control the conduction of transistors 130 and 131. Transistors 130 and 131 are each in series with a coil 132 and 133, respectively, of a four-way hydraulic servo valve generally designated as 134. Coils 132 and 133 are differentially wound and dependent upon the net current therethrough determine the magnitude of and direction of displacement of a solenoid plunger which determines the direction and magnitude of rotation of the shaft of a hydraulic motor 135. This arrangement is functionally illustrated in FIG. 15.

Transistors 130 and 131 function as amplifiers or variable resistors to control the net current $(i_1-i_2)$ through the differentially wound solenoid valve coils 132 and 133. Under balanced conditions, that is, when there is no error inputs to potentiometer 129 from the pulse shapers, $i_1=i_2$ and there is no movement of the hydraulic motor 135. In series with each of transistors 130 and 131 are resistors 136, 137 and 138, 139, respectively. The resistance values of resistors 137 and 139 are equal as are the resistance values of resistors 136 and 138. A resistor 140, common to both transistor circuits, is connected between bus line 111 and point 141. The value of resistance 140 is so chosen in relation to the voltage drop thereacross (approximately 7.5 volts) that the current I therethrough is essentially constant. Therefore, the sum of currents $i_1$ and $i_2$ is constant and a decrease in one of currents $i_1$ or $i_2$ results in an increase in the magnitude of the other. The base of transistor 130 is connected to the emitter of a transistor 142 and the base of transistor 131 is connected to the emitter of a transistor 143. In series with transistor 142 are resistors 144 and 145 and in series with transistor 143 are resistors 146 and 147. The resistance values of resistors 145 and 147 are equal, and the resistance values of resistors 144 and 146 are equal.

As thus far described it may be seen that the electronic portion of servo amplifier 70 is in a balanced push-pull arrangement. The bias on the base of transistor 143 is set by potentiometer 148. A dither signal DS is applied across potentiometer 148a to transistor 143 to overcome any magnetic hysteresis of the servo solenoid valve. Dither signal DS is of a relatively low frequency which the controlled member cannot follow.

Capacitors 149 and 150 are provided to prevent any step change in current through the solenoid coils 132 and 133 which would result in non-linearity, the diodes 151 and 152 clamp any voltage spikes which might be generated by the self inductance of coils 132 and 133 to a predetermined level. A milliameter 153 is connected between coils 132 and 133 to detect any imbalance in current therethrough when the amplifier is adjusted for zero error. A Zener diode 154 is connected between lines 111 and 110 to regulate the voltage therebetween.

In initially adjusting the system, signals indicative of constant velocity operation are applied to the system as from a prepared tape to cause the controlled member to move at a high speed. Then the setting of the arm of potentiometer 155 is adjusted to give the optimum response. This is the gain adjustment of the velocity loop of the system. The setting of potentiometer 155 determines the velocity loop gain. The position of the arm of potentiometer 156 is then adjusted to further optimize the velocity response. The application of $f_q$ pulses directly to amplifier 70 through potentiometer 156 serves to stabilize the system. The position of the arm of potentiometer 129 is adjusted to provide the desired gain and hence loop gain of the outer or position loop.

The shaped pulses of pulse frequency $f_{pf}$ are applied to one end of potentiometer 129 through a resistance circuit comprising resistor 157 and potentiometer 158, which decreases the amplitude of these pulses by a factor of sixteen. The shaped pulses of pulse frequency $f_{vf}$ are applied to the other end of potentiometer 129 through a resistance circuit comprising resistor 159 and potentiometer 160 which decreases the amplitude of the $f_{vf}$ pulses by a factor of thirty-two. This decrease in the amplitude of the $f_{pf}$ and $f_{vf}$ pulses compensates for the increased weight previously given in the error register and servo register, respectively.

The shaped $f_{pc}$ pulses and the shaped $f_{vc}$ pulses are also applied to opposite ends of potentiometer 129. The sum of the $f_{pc}$ and $f_{pf}$ pulses yields the pulse frequency $f_p$ described, and the sum of the $f_{vc}$ and $f_{vf}$ pulse yields the pulse frequency $f_v$, both previously discussed in conjunction with FIGS. 2 and 2a. The operation of servo amplifier 70 will now be considered. When point 127 of the pulse shapers, FIG. 13, is at 10.25 volts current will flow from the pulse shapers to line 112 through potentiometer 155. Under neutral conditions the $bf_1$ pulse component of $f_p$ and $f_v$ will occur every other clock cycle and the voltage and point 127 of pulse shapers 103 and 104 will fall to 4.0 volts. At this time current will flow from line 112 to points 127 of the pulse shapers. Inasmuch as the amplifier is set for this neutral condition no unbalance in $i_1$ and $i_2$ will occur and there will be no movement of the controlled member.

However, if a numerical representation of an error should now occur in the servo and error registers indicating that the contolled member is to move in a positive direction with respect to its path of movement, positive going 10.25 volt pulses (FIG. 14d) occur more often than every other clock cycle. This will increase the average voltage at the arm of potentiometer 155 and decrease the conductivity of transistor 142. This results in an increase in the voltage at the emitter of transistor 142 and the base of transistor 130. Current $i_1$ then decreases and current $i_2$ correspondingly increases. Servo valve 134 will then actuate hydraulic motor 135 to drive the controlled object in its positive direction. If the numerical representation in the error register and servo register should be negative the operation of servo amplifier 70 will be the reverse of that described.

The servo valve coils and the hydraulic motor are responsive to the area under the total pulses applied to potentiometer 129 and not to a representative voltage level. In fact the waveform applied to the servo valve coils may be quite irregular. The only requirement in this respect is that the frequency of the pulses applied to the amplifier be sufficiently high that the prime mover does not follow variations in frequency. In view of this, the reason for increasing the number of fine error pulses from the error and servo registers is apparent.

A suitable servo valve is a four-way proportional valve manufactured by Moog Servo Controls, Inc. of East Aurora, N.Y., identified as model No. 73–138 A. A suitable reversible hydraulic motor identified by the reference numeral 135, FIG. 15, is one manufactured by Vickers, Inc. of Detroit, Mich., part No. NF 953911307. Other suitable servo valves and hydraulic motors are available and are known to those skilled in the art. The drive portion of the servo system could be comprised of electrical components as well as hydraulic components.

In servo control systems as disclosed here where a number of variables or coordinates must be controlled simultaneously, the necessity for maintaining a consistent time lag between the commanded position and the actual position of the controlled part, from axis to axis, is well appreciated. The ability to control the position loop gain which affects transient response, without affecting the velocity lag constant is extremely valuable in optimizing system performance.

As previously described, a portion of the integrated velocity error signal $f_p$ is applied directly to the servo amplifier without passing through the second integrator. In a servo system having two variables to control as is the case in the disclosed system where both position and velocity of the controlled part must be controlled, the position loop gain determines the steady state lag, that is, the difference in the commanded position and the actual position under steady state conditions. This lag is a rigid function of velocity in order to keep the tracking error zero. The gain of the position loop also affects the transient response of the system. Where more than one axis of motion is involved as in the disclosed system it is very important to keep the position lag proportional to velocity with respect to all axes. As shown in FIG. 12, means (potentiometer 155) are provided to adjust and set the velocity loop gain without affecting the position loop gain. Other means (potentiometer 129) are further effective to then adjust the position loop gain without affecting the velocity loop gain. This is a very important feature, inasmuch as the lag constant which determines the tracking error and the velocity constant present opposing requirements.

Considering potentiometer 129, let it be assumed that the total potentiometer has a resistance value or voltage value thereacross of one. Then the portion between the arm of potentiometer 129 and terminal 161 may be designated C and the portion thereof between terminal 162 and arm 130 may be designated 1–C. Now as C approaches zero the inner or velocity loop of the system is opened and the system approaches one of the first order. Values of C greater than zero, but less than one, produce variable values of position loop gain without affecting the velocity lag constant. When C is equal to one the system becomes a normal second order system as pointed out in the discussion of FIG. 2a.

The setting of the arm of potentiometer 129 determines the relative weight in response of amplifier 70 to $f_p$ and $f_v$ pulses.

To consider operation of the system, assume that a controlled member, bed 25 is being moved along the Z-axis in a positive direction under steady state conditions. At this time there is a numerical representation of the position error in error register 76, but $f_z = f_q$ and this error is not changing. As a result of this error pulse frequency $f_p$ and its components $f_{pc}'$ and $f_{pf}$ are generated. Pulse frequency $f_p$ is applied to terminal 161 of potentiometer 129 and $f_{pc}'$ and $f_{pf}$ are applied to pulse adder 83 and compared with $f_q$ pulses. Under steady state conditions $(f_{pc}' + f_{pf}) = f_q$, so there will be no change in the numerical error in servo register 82, and no change in pulse frequency $f_v$ which is applied to terminal 162 of potentiometer 129. At this time bed 25 will be moving at a constant velocity, but will be lagging behind the commanded position by an error represented in numerical form in error register 76.

Assume now that all $f_z$ pulses have been applied to the servo system corresponding to a particular block of information on tape 38, and no new information has been read into the system. Therefore, bed 25 must decelerate and stop. This situation corresponds to a change in the repetition rate of pulse frequency $f_z$. The $f_q$ pulses now decrement the number held in error register 76. This indicates that the error between commanded position and actual position is decreasing. In response, pulse frequencies $f_p$ and the components thereof $f_{pc}'$ and $f_{pf}$ decrease. This produces less $f_p$ pulses at terminal 161 of potentiometer 129. Since $f_p$ is decreasing $f_q$ pulses will decrement the number in servo register 82 and pulse frequency $f_v$ will decrease. Therefore, the sum of the $f_v$ and $f_p$ pulses applied to terminals 161 and 162 of potentiometer 129 decrease as a function of the positon error and the required velocity to hold the position error constant. When $f_q$ pulses have decremented the error and servo registers to zero bed 25 will stop.

The relative weight or effect of $f_p$ and $f_v$ pulses depends on the setting of the arm of potentiometer 129. As the quantity C decreases a $f_v$ pulse has more weight than a $f_p$ pulse and vice versa. Therefore, as C is increased the gain of the position loop is increased without increasing the gain of the velocity loop, set by potentiometer 155.

QUANTIZER

The quantizer 71 supplies the feedback pulses $f_q$ for each incremental unit of motion of the controlled member. Each feedback pulse $f_q$ represents an incremental unit of movement which is equal to the movement commanded by a command pulse. The feedback pulses $f_q$ are delivered at a rate proportional to the velocity of the controlled object.

A preferred form of quantizer comprises a shaft encoder shown as a disk 165, with equal alternate opaque 166 and transparent 167 sections equally spaced around the face of the disk, shown in part in FIG. 16. Disk 165 is arranged to be mounted on and driven by lead screw 26. Disposed on one side of the disk are two photocells 168 and 169 and oppositely disposed on the other side of the photocells are two light sources, not shown. With the photocells arranged as shown in FIG. 16, they generate irregular sine wave voltages in quadrature, as shown in FIGS. 17a and 17b. FIG. 17a illustrates the waveform generated when a photocell is passed by three transparent sections. The sequence or phase lead of the two outputs of the photocells depends on the direction of rotation of the disk and this direction of rotation ultimately determines whether the feedback $f_q$ pulses will be plus or minus. The two sine wave voltages are fed to Schmitt trigger circuits 73, the outputs of which are synchronized or decoded to provide the feedback pulses $f_q$.

A Schmitt trigger circuit is in essence a squaring circuit such that its output is always a square wave regardless of the shape of the input wave. A Schmitt trigger yields an output so long as the level of the input is of a predetermined magnitude. FIG. 18 illustrates the relationship of the sinusoidal output waves of the photocells 168 and 169 and the corresponding rectangular wave derived from the Schmitt trigger circuits. The Schmitt triggers provide the output waveforms shown in FIGS. 17c and 17d in response to the waveforms of FIGS. 17a and 17b, respectively, produced by photocells 168 and 169. The trigger circuits produce a rectangular pulse whenever each sinusoidal pulse exceeds a predetermined magnitude M. Schmitt trigger circuits are well known to those skilled in the art and need not be explained here in detail. The outputs of the Schmitt trigger circuits PC1 and PC2 are applied to a synchronizer or decoder 74, FIG. 18 which produces $f_q$ and $-f_q$ pulses. Decoder 74 is arranged to sense whenever there is a change in condition of the Schmitt trigger pulses and provide an $f_q$ pulse in response thereto.

Decoder 74 comprises a symmetrical circuit, the left side of which will first be considered. One pulse train PC1 is applied directly to gate G73, and to gate G74 through inversion gate G72. Memory M50 assumes a state dependent upon the level of input PC1, set by a $f_q$ pulse. Gates G73 and G74 besides receiving the PC1 input receive inputs from memory M50 and corresponding gates G73' and G74'. Gates G73 and G74 will detect any discrepancy between the instantaneous state of the PC1 signal and the setting of memory M50. If a discrepancy is detected a signal disables one of gates G75 or G76 and the output thereof will not reset either memory M51 or memory M52. Subsequently gates G77, G78, G79 or G80 sense the discrepancy as stated by a set condition of memory M51 or memory M52, and also memory M50' to determine whether the direction of rotation is positive or negative. When this determination is made one of gates G77, G78, G79 or G80 will produce a $f_q$ or $-f_q$ feedback pulse.

The outputs of gates G77 and G78 provide $f_q$ pulses as do gates G80' and G79'. The outputs of gates G77 and G78 will set memory M50. The outputs of gates G79 and G80 will reset memory M50 to its other state. This removes the discrepancy between memory M50 and the level of PC1, until the level of PC1 changes again. In response thereto memories M51 or M52 will be set to enable or inhibit selected ones of gates G77–G80. The right side of the decoder circuit is identical in operation and construction to those of the left side and corresponding elements bear corresponding identifying numerals primed.

Consideration of the PC1 and PC2 output pulses of the trigger circuits, FIGS. 17c and 17d shows there are four changes of condition. These changes are: PC1 at "1" level and PC2 changes from "1" to "0" level; PC2 at "0" level and PC1 changes from "1" to "0" level; PC1 at "0" level and PC2 changes from "0" to "1" level; and PC2 at "1" level and PC1 changes from "0" to "1" level, which occur in that order when disk 165 is rotating in the indicated direction. When the direction of rotation of disk 165 is reversed, PC2 will lead PC1 and four conditions analogous to those previously pointed out will occur. In response to these eight conditions, gates G77–G80 and G77'–G80' are selectively enabled at C4 to provide an $f_q$ or $-f_q$ pulse. The maximum rate of production of $f_q$ pulses is one per clock cycle.

The operation of decoder 74 may best be understood by reference to Table III in conjunction with FIGS. 17c and 17d. Table III sets forth the condition of the elements of decoder 74 immediately after the times shown in FIGS. 17c and 17d. In the table the "0's" refer to a zero output and the "1's" refer to the negative voltage level output. The set condition of memories M50 and M50' at $t_1$ is representative of the levels of PC1 and PC2 immediately preceding $t_1$.

Memories M50, M52 and M51' are set by an input into their right sides, while memories M50', M52' and M51 are set by inputs into their left sides.

TABLE III

|      | $t_1$ | $t_2$ | $t_3$ | $t_4$ |
|------|-------|-------|-------|-------|
| PC1  | 1     | 0     | 0     | 1     |
| PC2  | 0     | 0     | 1     | 1     |
| M50  | Set   | Set   | Reset | Reset |
| M50' | Set   | Reset | Reset | Set   |
| G72  | 0     | 1     | 1     | 0     |
| G72' | 1     | 1     | 0     | 0     |
| G73  | 0     | 1     | 0     | 0     |
| G73' | 1     | 0     | 0     | 0     |
| G74  | 0     | 0     | 0     | 1     |
| G74' | 0     | 0     | 0     | 0     |
| G75  | 1     | 0     | 1     | 1     |
| G75' | 0     | 1     | 1     | 1     |
| G76  | 1     | 1     | 1     | 0     |
| G76' | 0     | 1     | 1     | 1     |
| M51  | Reset | Set   | Reset | Reset |
| M52  | Reset | Reset | Reset | Set   |
| M51' | Set   | Reset | Reset | Reset |
| M52' | Reset | Reset | Set   | Reset |
| G77  | 0     | 1     | 0     | 0     |
| G78  | 0     | 0     | 0     | 1     |
| G79  | 0     | 0     | 0     | 0     |
| G80  | 0     | 0     | 0     | 0     |
| G77' | 0     | 0     | 0     | 0     |
| G78' | 0     | 0     | 0     | 0     |
| G79' | 1     | 0     | 0     | 0     |
| G80' | 0     | 0     | 1     | 0     |

Table III illustrates the operation of decoder 74 when the direction of movement fo the controlled object is positive with respect to its path of travel. Under these conditions gates G79', G77, G80' and G78 may provide $f_q$ pulses at times $t_1$, $t_2$, $t_3$, and $t_4$, respectively. When the direction of movement of the controlled object is reversed $-f_q$ pulses may be derived from gates G79, G80, G77' and G78'. It will be apparent that the spacing between successive PC1 pulses and successive PC2 pulses, as well as the width of the pulses will depend on the speed of rotation of disk 165.

The time interval $t_1$–$t_4$ in FIG. 17 represents the time required for the disk to move two sections past a photocell.

From the foregoing disclosure, it may be seen that the objects of the invention set forth, as well as those made apparent from the detailed description are efficiently attained. Certain features disclosed herein but not claimed are the invention of Johann F. Reuteler and Edward E. Kirkham, and are claimed in their co-pending application Serial No. 349,222 filed on the same date, and assigned to the same assignee as this application.

While a preferred embodiment of the invention has been illustrated and described for purposes of disclosure, modifications to the disclosed embodiments of the invention as well as other embodiments thereof which do not depart from the scope of the invention may occur to those skilled in the art. Accordingly, the appended claims are intended to encompass all embodiments of the invention which do not depart from the spirit and scope of the invention.

What is claimed is:

1. A system for moving an object a desired distance in a predetermined interval of time comprising, means supplying a command signal indicative of the extent and velocity of movement of the object, means for deriving a feedback signal indicative of the actual extent of movement and velocity of the object, first comparison means, means for applying the command signal and the feedback signal to said first comparison means, said first comparison means being effective to provide a representation of the difference between the commanded and actual position of the object, means for producing a first velocity signal proportional to the position representation, second comparison means, means for applying the first velocity signal and the feedback signal to said second comparison means, said second comparison means being effective to provide a representation of the algebraic difference between the first velocity signal and the feedback signal, means for producing a second velocity signal proportional to the representation of said second comparison means, and means for combining the first and second velocity signals in a predetermined relationship to provide a resultant signal for moving the object at the desired velocity.

2. The system of claim 1 wherein said combining means comprises a potentiometer and said first and second velocity signals are applied to opposite ends of said potentiometer, said potentiometer having a contact arm thereon, and amplifying means for receiving the resultant signal from said potentiometer arm and controlling movement of the object in response thereto.

3. The system of claim 1 wherein only predetermined portions of the first and second velocity signals comprise the resultant signal, the portions having the relationship of C and 1–C where C has a value between zero and one.

4. A system for moving an object a desired distance in a predetermined interval of time comprising, means supplying a command signal indicative of the extent and velocity of movement of the object, means for deriving a feedback signal indicative of the actual extent of movement and velocity of the object, first comparison means, means for applying the command signal to said first comparison means, means for applying the feedback signal to said comparison means to form a first feedback loop, said first comparison means being effective to provide a representation of the difference between the commanded and actual position of the object, means for producing a first velocity signal proportional to the position representation, second comparison means, means for applying the first velocity signal to said second comparison means, means for applying the feedback signal to said second comparison means to form a second feedback loop, said second comparison means being effective to provide a representation of the algebraic difference between the first velocity signal and the feedback signal, means for producing a second velocity signal proportional to the representation of said second comparison means, means for combining the first and second velocity signals in a predetermined relationship to provide a resultant signal for moving the object at the desired velocity, and means for adjusting the gain of said first loop without affecting the gain of said second loop.

5. A system for moving an object a desired distance in a predetermined interval of time comprising, a prime mover for driving the object, amplifying means for controlling operation of the prime mover, means supplying a command signal indicative of the extent and velocity of movement of the object, means for deriving a feedback signal indicative of the actual extent of movement and velocity of the object, first comparison means, means for applying the command signal and the feedback signal to said first comparison means, said first comparison means being effective to provide a representation of the difference between the commanded and actual position of the object, means for producing a first velocity signal proportional to the position representation, second comparison means, means for applying the first velocity signal and the feedback signal to said second comparison means, said second comparison means being effective to provide a representation of the algebraic difference between the velocity signal and the feedback signal, means for producing a second velocity signal proportional to the representation of said second comparison means, means for combining the first and second velocity signals in a predetermined relationship to provide a resultant signal, and means for applying the resultant signal to said amplifying means.

6. A system for moving an object a desired distance in a predetermined interval of time comprising, means for supplying a command signal indicative of the extent of movement and velocity of movement of the object, means for deriving a feedback signal indicative of the actual extent of movement and the velocity of the object, means for algebraically comparing the command and feedback signals to derive a signal indicative of the velocity error between the commanded velocity and the actual velocity of the object, means for integrating the velocity error signal to derive a representation of the difference between the commanded position and the actual position, means for producing a first velocity signal proportional to said position representation, means for algebraically comparing the first velocity signal with the feedback signal to derive a second velocity signal proportional to a velocity of the object required to eliminate the velocity error, and means for combining the first and second velocity signals in a predetermined relationship to provide a resultant signal, and means for utilizing the resultant signal to control the velocity of the object.

7. The system of claim 6 wherein only predetermined portions of each of the first and second velocity signals comprise the resultant signal, the portions having the relationship of C and 1–C where C has a value between zero and one.

8. The system of claim 6 further comprising amplifying means for controlling movement of the object, and a potentiometer having a movable arm thereon, first and second velocity signals being applied to opposite ends of said potentiometer, and said arm being connected to said amplifying means to apply the resultant signal thereto.

9. A system for moving an object a desired distance in a predetermined interval of time comprising, means for supplying a command signal indicative of the extent of movement and velocity of movement of the object, means for deriving a feedback signal indicative of the actual extent of movement of the object and velocity of movement of the object, means for algebraically comparing the command and feedback signals to derive a signal indicative of the velocity error between the commanded velocity and the actual velocity of the object, means for integrating the velocity error signal to derive a representation of the difference between the commanded position and the actual position, means for producing a first velocity signal proportional to said position representation, means for algebraically comparing the first velocity signal with the feedback signal signal to derive a second velocity signal proportional to a velocity of the object required to eliminate the velocity error, means for statically storing a numerical representation of the second velocity signal, and means for combining the first velocity signal and the second velocity signal in a predetermined relationship and utilizing the resultant thereof to control the velocity of the object.

10. The system of claim 9 wherein only predetermined portions of each of the first and second velocity signals control the velocity of the object, the portions having the relationship C and 1–C where C has a value between zero and one.

11. The system of claim 9 further comprising amplifying means for controlling movement of the object, and a potentiometer having a contact arm thereon, the first and second velocity signals being applied to opposite ends of said potentiometer, and said arm being connected to said amplifying means.

12. A system for moving an object a distance proportional to a number of command pulses at a velocity proportional to the rate of repetition of the command pulses, each command pulse representing an incremental distance of movement of the object, comprising means for deriving feedback pulses proportional in number to the movement of the object and in rate of repetition to the velocity of the object, means for comparing the command pulses and the feedback pulses to derive a pulse frequency indicative of the error between commanded velocity of the object and actual velocity thereof, means for algebraically summing the pulses of the pulse frequency to establish a numerical representation of the error between the commanded position and the actual position of the object, means responsive to the position representation for producing a series of pulses having a rate of repetition proportional to the position error, means for comparing the series of pulses with the feedback pulses to derive a second pulse frequency having a repetition rate indicative of a velocity of the object required to eliminate the error between commanded velocity and actual velocity, pulse responsive means for moving the object, and means for applying the first and second pulse frequencies to said drive means, said means for moving in a predetermined relative relationship to produce movement of the object at a desired velocity.

13. The system of claim 12 wherein said means for moving comprises a prime mover and an amplifying device for controlling operation of said prime mover, said amplifying device having input circuits for separately receiving the first and second pulse frequencies and combining means for determining the relative weight to be given each pulse frequency, the pulse frequencies being utilized in the relationship C and 1–C where C has a value between zero and one.

14. The system of claim 12 further comprising a potentiometer having a contact arm thereon, the first and second pulse frequencies being applied to opposite ends of said potentiometer, and a resulting signal appearing at said contact arm being applied to said moving means to move the object.

15. A system for moving an object a distance proportional to a number of command pulses at a velocity proportional to the rate of repetition of the command pulses, each command pulse representing an incremental distance of movement of the object, comprising means for deriving feedback pulses proportional in number to the movement of the object and in rate of repetition to the velocity of the object, means for algebraically summing the command pulses and the feedback pulses to establish a numerical representation of the error between the commanded position and the actual position of the object, means responsive to the representation for producing a first pulse frequency having a number of pulses and a rate of repetition proportional to the position error representation, means for algebraically summing the pulses of the first pulse frequency and the feedback pulses and establishing a numerical representation of the difference therebetween, means responive to said last mentioned numerical representation for producing a third pulse frequency proportional in number of pulses and in repetition rate to said last mentioned numerical representatiton, pulse responsive means for moving the object, means for combining the first and third pulse frequencies in a predetermined relationship, and applying the combined pulse frequencies to said means for moving to drive the object at a desired velocity.

16. The system of claim 15 further comprising means receiving the pulses of the first and third pulse frequencies and providing a resultant signal comprising portions of the first and third pulse frequency signals, the portions having the relationship C and 1–C where C has a value between zero and one and means for applying the resultant signal to said means for moving to produce movement of the object in accordance with the resultant signal.

17. The system of claim 15 wherein said means for moving comprises a prime mover and an amplifying means for controlling operation of said prime mover, and said summing means comprises a potentiometer having a contact arm thereon, the first and third pulse frequencies being applied to opposite ends of said potentiometer and the arm of said potentiometer applying the resultant signal to said amplifying means.

18. A system for moving an object a distance proportional to a number of command pulses at a velocity proportional to the rate of repetition of the command pulses, each command pulse representing an incremental distance of movement of the object comprising, means for applying command pulses to the system, means for deriving feedback pulses proportional in number to the movement of the object and in rate of repetition to the velocity of the object, means for algebraically summing the command pulses and the feedback pulses to establish a numerical representation of the error between the commanded position and the actual position of the object, means responsive to the representation for producing a first pulse frequency having a number of pulses and a rate of repetition proportional to the position error representation, means for comparing the pulses of the first pulse frequency and the feedback pulses to derive a second pulse frequency, means for moving the object, and combining means receiving the pulses of the first and second pulse frequencies and providing a resultant signal comprising portions of the first and second pulse frequencies, the portions having the relationship C and 1–C where C has a value between zero and one and means for applying the resultant signal to said means for moving to produce movement of the object in accordance with the resultant signal.

19. The system of claim 18 wherein said means for moving comprises a prime mover and an amplifying means for controlling operation of said prime mover, and said combining means comprises a potentiometer having a contact arm thereon, the first and second pulse frequencies being applied to opposite ends of said potentiometer and the arm of said potentiometer applying the resultant signal to said amplifying means.

20. A system for moving an object in either direction with respect to a reference path a distance determined by a number of command pulses received thereby and at a velocity proportional to the repetition rate of the command pulses comprising, means for deriving a train of feedback pulses indicative of the actual movement of the object and having a pulse repetition rate proportional to the velocity of the object, each feedback pulse being proportional to an incremental unit of distance of the object and equal to the increment represented by a command pulse; a first bi-directional pulse counter, said first counter being adapted to accept incrementing command pulses indicative of one direction of commanded movement, decrementing command pulses indicative of the other direction of commanded movement, incrementing feedback pulses indicative of one direction of movement and decrementing feedback pulses indicative of the other direction of movement, said first counter being adapted to hold a numerical pulse count therein representing the error between the commanded and actual position of the object and the alegbraic sign of the error, means for generating a first pulse train having a pulse repetition rate proportional to the number held in said counter and the alegbraic sign of the number, the magnitude of the number in the counter being determined by the deviation of the pulse repetition rate of the first pulse train from the repetition rate of a reference pulse frequency and the alegbraic sign of the number being determined by the direction of deviation, means for deriving from the first pulse train a second pulse train having a pulse repetition rate proportional to the absolute number in said first counter; a second bi-directional counter adapted to receive the pulses of the second pulse train at an incrementing or decrementing input, said second counter also having means for receiving the feedback pulses at an incrementing or decrementing input dependent on the direction of motion of the object, means for applying the pulses of the second pulse train to an input of said second counter determined by the algebraic sign of the number in the first counter, means for applying feedback pulses to said second counter at an input determined by the direction of movement of the object, said second counter being adapted to hold a numerical pulse count therein representing the algebraic difference in the number of pulses of the second pulse train and feedback pulses received thereby and indicate the alegbraic sign of the difference, means for generating a third pulse train having a pulse repetition rate proportional to the number held in said counter and the algebraic sign of the number, the magnitude of the number in said second counter being determined by the deviation of the pulse repetition rate of the third pulse train from the repetition rate of a reference pulse frequency and the algebraic sign of the number being determined by the direction of deviation; means for combining the pulses of the first pulse train and the pulses of the third pulse train in the relationship of C and 1–C to provide a resultant signal, where C has a value between zero and one, amplifying means responsive to the deviation in repetition rate of the pulses of the resultant signal with respect to a reference pulse frequency for controlling the direction of the movement and velocity of the object, and means for applying the resultant signal to said amplifying means.

21. A system for moving an object in either direction with respect to a reference path a distance determined by a number of command pulses received thereby and at a velocity proportional to the repetition rate of the command pulses comprising, means for deriving a train of feedback pulses indicative of the actual movement of the object and having a pulse repetition rate proportional to the velocity of the object, each feedback pulse being proportional to an incremental unit of distance of the object and equal to the increment represented by a command pulse; a first bi-directional pulse counter, said first counter being adapted to accept incrementing command pulses indicative of one direction of commanded movement, decrementing command pulses indicative of the other direction of commanded movement, incrementing feedback pulses indicative of one direction of movement and decrementing feedback pulses indicative of the other direction of movement, said first counter being adapted to hold a numerical pulse count therein representing the error between the commanded and actual position of the object and the algebraic sign of the error, means for generating a first pulse train having a pulse repetition rate proportional to the number held in said counter and the algebraic sign of the number, the magnitude of the number in the counter being determined by the deviation of the pulse repetition rate of the first pulse train from the repetition rate of a reference pulse frequency and the algebraic sign of the number being determined by the direction of deviation, means for deriving from the first pulse train a second pulse train having a pulse repetition rate proportional to the absolute number in said first counter; a second bi-directional counter adapted to receive the pulses of the second pulse train at an incrementing or decrementing input, said second counter also having means for receiving the feedback pulses at an incrementing or decrementing input dependent on the direction of motion of the object, means for applying the pulses of the second pulse train to an input of said second counter determined by the algebraic sign of the number in the first counter, means for applying feedback pulses to said second counter at an input determined by the direction of movement of the object, said second counter being adapted to hold a numerical pulse count therein representing the algebraic difference in the number of pulses of the second pulse train and feedback pulses received thereby and the algebraic sign of the difference, means for generating a third pulse train having a pulse repetition rate proportional to the number held in said counter and the algebraic sign of the number, the magnitude of the number in said second counter being determined by the deviation of the pulse repetition rate of the third pulse train from the repetition rate of a reference pulse frequency and the algebraic sign of the number being determined by the direction of deviation; means for combining the pulses of the first pulse train and the pulses of the third pulse train in a predetermined relative relationship to provide a resultant signal, amplifying means responsive to the deviation in repetition rate of the pulses of the resultant signal with respect to a reference pulse frequency for controlling the direction of the movement and velocity of the object, and means for applying the resultant signal to said amplifying means.

22. The system of claim 21 further including means for adjusting the relative relationship in which the pulses of the first and third pulse trains are combined.

23. A system for moving an object in either direction with respect to a reference path a distance determined by a number of command pulses received thereby and at a velocity proportional to the repetition rate of the command pulses comprising, means for deriving a train of feedback pulses indicative of the actual movement of the object and having a pulse repetition rate proportional to the velocity of the object, each feedback pulse being proportional to an incremental unit of distance of the object and equal to the increment represented by a command pulse; a first bi-directional pulse counter, said first counter being adapted to accept incrementing command pulses indicative of one direction of commanded movement, decrementing command pulses indicative of the other direction of commanded movement, incrementing feedback pulses indicative of one direction of movement and decrementing feedback pulses indicative of the other direction of movement, said first counter being adapted to hold a numerical pulse count therein representing the error between the commanded and actual position of the object and the algebraic sign of the error, means for generating a first pulse train having a pulse repetition rate proportional to the number held in said counter; a second bi-directional counter adapted to receive the pulses of the second pulse train at an incrementing or decrementing input, said second counter also having means for receiving the feedback pulses at an incrementing or decrementing input dependent on the direction of motion of the object, means for applying the pulses of the first pulse train to an input of said second counter determined by the algebraic sign of the number in the first counter, means for applying feedback pulses to said second counter at an input determined by the direction of movement of the object, said second counter being adapted to hold a numerical pulse count therein representing the algebraic difference in the number of pulses of the second pulse train and feedback pulses received thereby and indicate the algebraic sign of the difference, means for generating a second pulse train having a pulse repetition rate proportional to the number held in said counter and the algebraic sign of the number, the magnitude of the number in said second counter being determined by the deviation of the pulse repetition rate of the second pulse train from the repetition rate of a reference pulse frequency and the algebraic sign of the number being determined by the direction of deviation; amplifying means responsive to the deviation in repetition rate of the pulses of the second pulse train with respect to the reference pulse frequency for controlling the direction of the movement and velocity of the object, and means for applying the second pulse train to said amplifying means.

24. In a system for moving an object a distance determined by a number of pulses received thereby and at a velocity proportional to the repetition rate of the pulses, an amplifier for yielding an output signal indicative of a desired direction of motion and velocity of an object dependent on the repetition rate of pulses received thereby, said amplifier being arranged to yield a neutral output signal upon receipt thereby of pulses at a predetermined rate, said amplifier being arranged to yield a signal indicative of a first direction of motion and velocity when the pulses received thereby are at a repetition rate exceeding said predetermined rate and being arranged to yield a signal indicative of a second direction of motion and velocity when pulses received thereby are at a repetition rate less than said predetermined rate, and means responsive to the output signal of the amplifier for controlling the direction of motion and the velocity of the object, the magnitude of deviation in the repetition rate of pulses from said predetermined rate determining the velocity of the object.

25. In a system for moving an object in either direction with respect to a reference path a distance proportional to a number of command pulses received including means for deriving a train of feedback pulses each indicative of an incremental unit of distance equal to the distance commanded by a command pulse, a bi-directional pulse counter comprising a multiplicity of cascaded stages, the last significant stage of said counter having separate means for receiving incrementing command pulses, decrementing command pulses, incrementing feedback pulses and decrementing feedback pulses, means for sensing simultaneous receipt of an incrementing command pulse and an incrementing feedback pulse and forwarding a carry signal to the next higher order stage, and means for sensing simultaneous receipt of a decrementing command pulse and a decrementing feedback pulse and forwarding a borrow signal to the next higher order stage.

26. In a system for moving an object in either direction with respect to a reference path a distance proportional to a number of command pulses received including means for deriving a train of feedback pulses each indicative of an incremental unit of distance equal to the distance commanded by a command pulse, a bi-directional pulse counter comprising a multiplicity of cascaded stages, the least significant stage of said counter having means for simultaneously receiving incrementing command pulses, decrementing command pulses, incrementing feedback pulses and decrementing feedback pulses, means for sensing simultaneous receipt of an incrementing command pulse and an incrementing feedback pulse and forwarding a carry signal to the next higher order stage, and means for sensing simultaneous receipt of a decrementing command pulse and a decrementing feedback pulse and forwarding a borrow signal to the next higher order stage.

27. In a system for moving an object in either direction with respect to a reference path a distance proportional to a number of command pulses received thereby including means for deriving a train of feedback pulses each indicative of an incremental unit of distance equal to the distance commanded by a command pulse; a bi-directional pulse counter for algebraically summing incrementing and decrementing command and feedback pulses comprising, a multiplicity of cascaded numerical stages and an additional stage following the most significant stage arranged to denote the algebraic sign of a number held in said counter, each of said numerical stages comprising a first bi-stable device arranged to be set to a first state upon receipt of an increment, a second bi-stable device arranged to be set to a first state upon receipt of a decrement, third and fourth bi-stable devices arranged to be alternately set to a state indicative of a bit presently in the stage, means for adding a received increment and a bit in said third bi-stable device and forwarding an increment to the next higher order stage, means for subtracting a received decrement from the information in said fourth bi-stable device and forwarding a borrow, if present, to the next higher order stage, said additional stage comprising a bi-stable device set in a first state if the number in said counter is zero or greater and reset in a second state if a decrement is sensed in the most significant numerical stage, the least significant stage having means for simultaneously accepting incrementing and decrementing pulses.

References Cited

UNITED STATES PATENTS

| | | | |
|---|---|---|---|
| 3,069,608 | 12/1962 | Forrester et al. | 318—162 |
| 3,206,663 | 9/1965 | Neal et al. | 318—18 |
| 3,241,027 | 3/1966 | Albright | 318—29 |
| 3,246,125 | 4/1966 | Mergler | 318—18 XR |

BENJAMIN DOBECK, *Primary Examiner.*

U.S. Cl. X.R.

235—151.11; 318—28, 162

PO-1050
(5/69)

UNITED STATES PATENT OFFICE
CERTIFICATE OF CORRECTION

Patent No. 3,443,178                    Dated  May 6, 1969

Inventor(s)            Johann F. Reuteler

It is certified that error appears in the above-identified patent and that said Letters Patent are hereby corrected as shown below:

Column 3, reverse lines 42 and 43 to read as follows: --block form of the servo register of FIG. 2 together with associated sample logic and number-to-frequency conver- --. Column 5, starting with line 72 through Column 7 line 69 should precede subheading "SERVO SYSTEM" in Column 4. Column 10, line 25, "76a-76h" should read --76a-76g--. Column 11, line 28, after "will" insert --be--. Column 12, line 67, after "Table" cancel "I" and insert --II--. Column 14, line 73, after "gate" delete "38" and insert --G38--. Column 15, line 53, change "resent" to -- reset --. Column 17, line 1, "$f_{pn}$," should read --$f_{pc}'$--. Column 23, line 46, after "G74'" insert a period. Column 24, line 12, delete "thet imes" and substitute --the times--. Column 26, line 57, delete "signal" second occurrence. Column 27, line 58, "responive" should read --responsive--. Column 31, line 22, "last" should read --least--.

SIGNED AND
SEALED

APR 7 1970

(SEAL)
Attest:

Edward M. Fletcher, Jr.
Attesting Officer

WILLIAM E. SCHUYLER, JR.
Commissioner of Patents